United States Patent [19]

Rogers et al.

[11] Patent Number: 5,325,844

[45] Date of Patent: Jul. 5, 1994

[54] LIGHTWEIGHT, DISTRIBUTED FORCE, TWO-AXIS TRACKING, SOLAR RADIATION COLLECTOR STRUCTURES

[75] Inventors: William E. Rogers; David N. Borton, both of Troy; John E. Durnin, Grafton, all of N.Y.

[73] Assignee: Power Kinetics, Inc., Troy, N.Y.

[21] Appl. No.: 834,165

[22] Filed: Feb. 11, 1992

[51] Int. Cl.$^5$ ............................... F24J 2/38; F24J 2/10
[52] U.S. Cl. ................................. 126/605; 126/600; 126/690; 126/696
[58] Field of Search ............... 126/424, 425, 438, 600, 126/605, 696, 690; 250/203 R; 353/3; 343/765, 912, 915, 916; 359/429, 430, 853, 876

[56] References Cited

U.S. PATENT DOCUMENTS

| | | | |
|---|---|---|---|
| 670,917 | 3/1901 | Eneas | 126/438 |
| 3,905,352 | 9/1975 | Jahn | 126/425 |
| 4,171,876 | 10/1979 | Wood | 126/438 X |
| 4,209,231 | 6/1980 | Sayre | 359/853 |
| 4,333,446 | 6/1982 | Smyth | 359/853 X |
| 4,491,388 | 1/1985 | Wood | 350/636 |
| 4,608,964 | 9/1986 | Russo | 126/438 |
| 4,820,033 | 4/1989 | Sick | 126/438 |
| 4,870,949 | 10/1989 | Butler | 126/438 X |

Primary Examiner—Carl D. Price
Attorney, Agent, or Firm—Joseph V. Claeys

[57] ABSTRACT

A solar radiation collector system includes a curved rim, a collector assembly including a plurality of solar radiation transducer elements passing through the plane of and connected to the curved rim, and a plurality of relatively small diameter tension members connected in distributed manner between the curved rim and the collector assembly and forming a stiff, lightweight, bicycle wheel-type tension-compression support structure. The support structure is rotatably supported from the ground in a manner to allow for three dimensionally stable support and rotation of at least ninety degrees with respect to the ground. Rotation of the bicycle wheel-type tension-compression support structure provides for a desired primary tracking motion to adjust for the apparent motion of the sun, and movement of the transducer elements provides for a second dimension adjustment for the apparent motion of the sun.

31 Claims, 23 Drawing Sheets

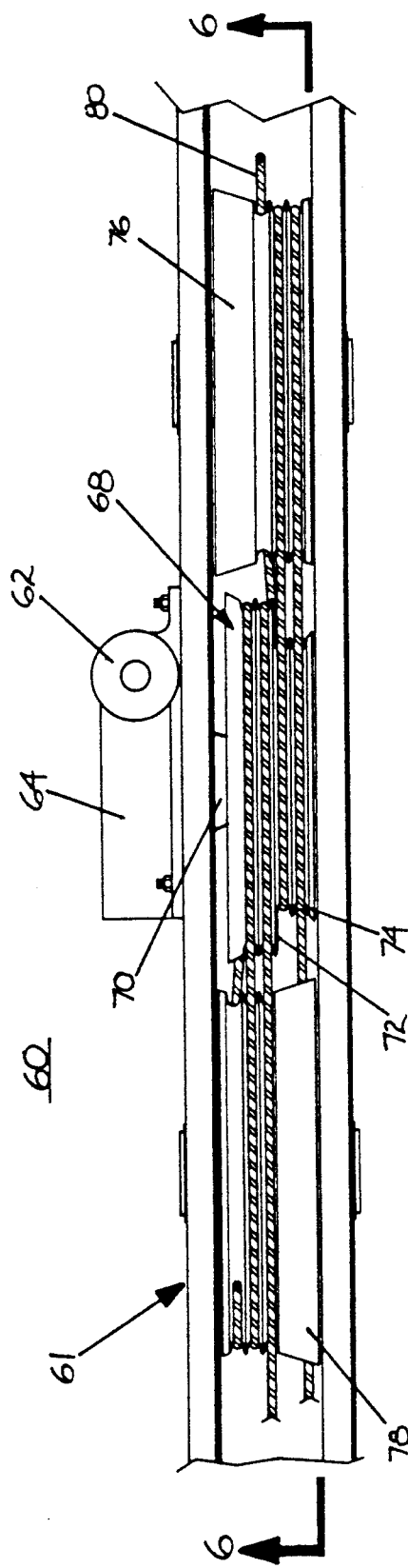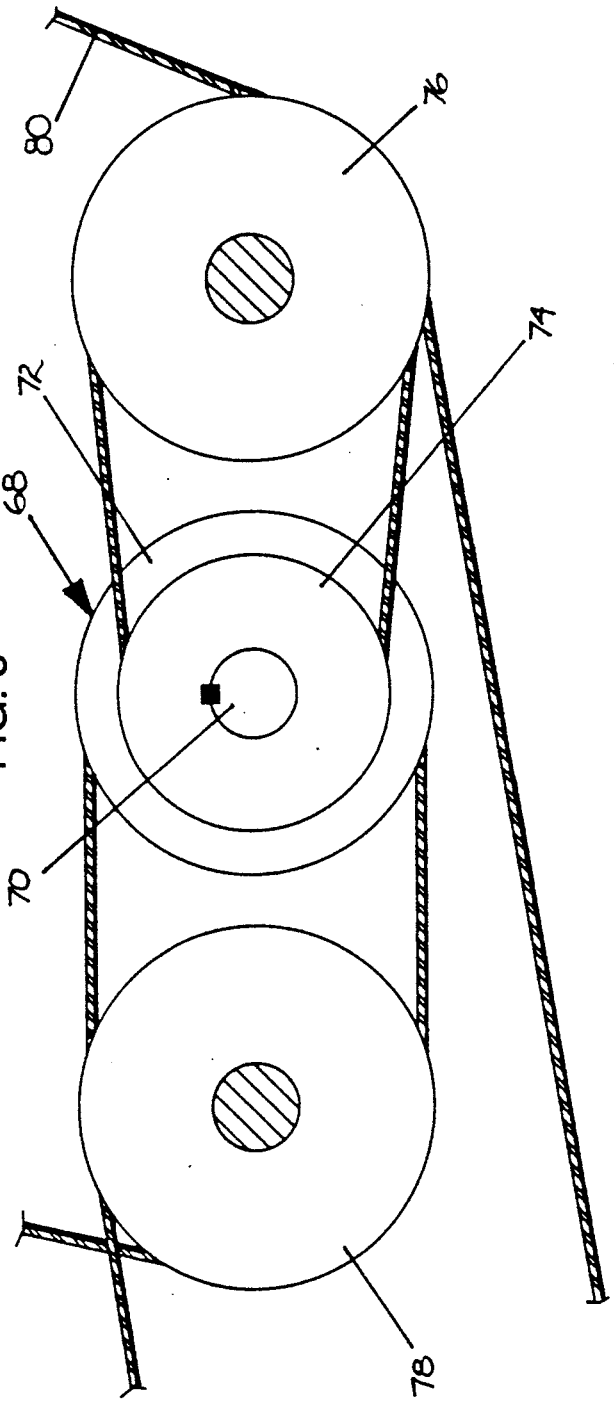
FIG. 5
FIG. 6

LIGHTWEIGHT, DISTRIBUTED FORCE, TWO-AXIS TRACKING, SOLAR RADIATION COLLECTOR STRUCTURES

This invention relates to the field of electromagnetic radiation collector systems and more particularly to solar radiation collector systems including heliostats, solar furnaces, and point-focus collector systems.

While this invention is applicable to a wide range of electromagnetic radiation collector systems and to other systems which require precise two-axis tracking of a body, it is especially advantageous for use as solar radiation collector systems, solar furnaces, and heliostats and will be particularly described in these connections.

Also, the invention will be described in detail as being equatorially oriented, however, it is to be understood that this is merely for convenience and that the invention is not limited to this particular orientation and can be arranged in any other suitable way, such as for example, azimuth/altitude, or the like. Moreover, the plane of the concentrator can be either perpendicular to the plane of the curved rim or disposed at some other angle. For example, the concentrator frame and transducer elements carded thereby may be disposed at an angle in the range of about 40 to 50 degrees with respect to the axis of rotation to permit the "fixed focus" operation of a solar furnace as shown, for example, in FIGS. 14 and 15. For use as a heliostat, illustrated in FIG. 16, latitude and its location relative to the central receiver determines the relationships between the concentrator frame and the axis of rotation as well as the latter with the ground.

Further, as used in the specification and in the claims the terms "selective movement of the transducer elements" and "selectively moved" means and includes the movement of the transducer elements either individually or in groups with respect to the frame or other structure on which such elements are carried. That is, the foregoing definition is intended to clearly distinguish such selectively movable arrangement from arrangements which provide either for the movement of an entire concentrator assembly, the movement of the entire reflective surface of the concentrator assembly, or other arrangements which effect the movement of all of the mirrors or other transducer elements as a single group.

BACKGROUND OF THE INVENTION

Briefly, a typical prior art concentrating solar collector system comprises a concentrator having a suitable reflective surface which may be formed from a plurality of individual mirrors, a receiver for receiving or absorbing the concentrated solar radiation, and associated support structures. The solar collector system is also provided with suitable primary and secondary tracking means so that the mirrors can be made to follow the apparent movement of the sun on a daily as well as on a seasonal basis. A point-focusing solar collector system is arranged and constructed so that the sun's rays falling on the reflective surface are focused into the receiver to be utilized in any well known manner, such as for example to heat a suitable circulating fluid which can be used to power an engine or be transported elsewhere for various uses, applied directly to photovoltaic or other suitable direct energy conversion devices, applied to a solar reactor for a variety of chemical processes, and the like. The receiver can be arranged to move with the concentrator or be fixed with respect to the moving concentrator assembly.

The prior art is replete with a multitude of different designs of solar collector systems and support and tracking structures. Although ring and wheel type members have been employed in a variety of ways in the prior art, many of such prior art systems are not practicable and of those that are, all have been complex, heavy and expensive and none have been entirely satisfactory in meeting the commercial requirements of the marketplace.

German Patent No. DE-34188-879-A-1 (Mayr) is one of many examples of solar collector systems which utilize an integral arcuate ring or rings to provide for the secondary tracking motion, which rings are in turn mounted on a turntable which provides the primary tracking motion. Although the ring usually includes tension members to stabilize the ring, such ring is employed to provide for the secondary tracking motion and not the primary tracking motion. Moreover, in such system the weight is not carded by the rim but rather by hubs in a gimbal mount arrangement. In addition to carrying the weight, the hubs in the Mayr structure must also transmit the forces needed to balance the cumulative forces imparted by all the tension members. These forces, in turn, must then be externally accommodated in the turntable structure and gimbal mount which requires that they be quite heavy.

U.S. Pat. No. 4,209,231 (Sayre) employs a plurality of mirrors in a rectangular array which is diametrically mounted within a pair of circular rims which extend perpendicular to the mirror array. The rims are rotated to adjust the elevational orientation of the mirror assembly and are in turn mounted for rotation on a turntable to adjust the azimuth orientation of the mirror assembly.

Although turntables used in such prior art structures provide for distributed support to foundations, these approaches are limited to modest sizes. Turntables which do not use spokes are limited to small sizes (concentrators under 50 square meters) because of the weight of the ring required to transmit the wind forces involved in larger concentrators. Turntables which do use spokes (typically supporting concentrators under 200 square meters) are also limited by the need to prevent uplift. If uplift is prevented at the hub, very large forces are involved unless the length of the moment arm (the radius of the ring) is also made large and expensive. To prevent uplift through the connections between the turntable ring and the foundations requires elaborate mechanisms which both capture the specially shaped ring under all conditions and also allow its rotation. Because these supports interface with the circular frame in only one plane, transmitting both radial and axial loads associated with wind and gravity forces requires that they employ a plurality of supports (which for equatorial mounts in the tropics become very long and expensive) and a very substantial and expensive circular ring. In addition, these prior art approaches require complicated and expensive connections in order to accommodate the concentrated forces at any orientation and at the same time minimize the backlash without binding. An inopportune gust of wind when the concentrator is facing the horizon, for example, can pry such prior art devices off their foundation piers.

U.S. Pat. No. 4,870,949 (Butler), describes a centerless drive tracking arrangement which utilizes a drive ring to support a dish solar concentrator, which concentrator may be either fixed or pivotally mounted within the drive ring. The tracking system of the foregoing Butler patent uses a centerless drive for elevation tracking combined with centerless drive or pivoted azimuth tracking. The various rings of the various Butler configurations are independent from each other. The shape and strength of the ring used for orienting the collector system in the primary direction does not contribute to the shape and strength of the ring which supports the concentrator. This requires the expense of redundant materials. The rings used for the primary tracking motion rely simply on the strength of the rings to maintain their shape. Transmitting the forces of the wind on the concentrator to the ground results in substantial deflections which vary as a function of attitude, since these forces are carried through stress concentration regions both at the points which support the concentrator and at the interfaces with the foundations. These simple rings or hoops do not transmit either radial or axial loads without distortion unless they are made extraordinarily heavy or the concentrator area is kept small. Because the support structure moves within the primary ring, the optical effects of these structural deflections of the independent structures are cumulative.

The present invention employs one or more curved rim members in combination with other components arranged to form an open structure in a tension-compression mode which produces a very strong, stiff and lightweight tension-compression main support and tracking structure which is stable in all orientations. For example, in one embodiment the main tension-compression support structure is arranged and constructed in a bicycle wheel type tension-compression rim-spoke configuration. To the best of Applicants' knowledge none of the prior art systems and structures, including those which employ ring or wheel type members have employed such rings or wheels as in the present invention, wherein the curved rim member is arranged in combination with suitable structural means and tension members to produce a very strong and light-weight main support structure in a tension-compression mode, which can also provide for primary horizon to horizon tracking motion. The main primary tracking support structure of this invention, in addition to being very strong and light-weight, is capable of supporting large heavy loads and distributing both axial and radial loads directly to the ground through all orientations of the main support structure, and is much less expensive to manufacture and install than any other prior art structures or systems of which Applicants are aware.

Most heliostats, solar furnaces, and point-focus solar collector systems utilize a concentrator consisting of either a single monolithic reflector or one made of a static Fresnel array of mirrors. These systems follow the apparent daily and seasonal movement of the sun by moving on two axes. The reflector of both a heliostat and a solar furnace reflects sunlight to a stationary focal region. In a point focus solar collector system, the receiver moves along with the reflector. A simple prior art approach for supporting such concentrators has been the use of a single pedestal which accommodates the two drives. The cost of transmitting gravity and wind forces of the active structure through the drives and into the foundation has limited this approach to concentrators of about 100 square meters.

Point-focusing dish solar concentrators provide the highest possible optical and operating performance, high temperature capability (1500 degrees Centigrade and above), minimum land use, and a high degree of modularity (power plant sizes from kilowatts to hundreds of megawatts). Accordingly, such dish concentrator systems are very versatile and are adaptable to many near term markets for solar thermal applications, particularly electric power generation in remote and community-scale installations, as well as, providing industrial process heat, including producing high value chemicals, renewable fuels (hydrogen), and destroying toxic wastes.

It has long been recognized that the concentrator of a point-focusing solar collector system accounts for a relatively large part of the total solar collector system cost. In order to gain better economy of scale, the concentrator should be large. For a number of years the Assignee of this invention, Power Kinetics, Inc. of Troy, N.Y., has designed and built many solar collector systems which follow the daily apparent movement of the sun on one axis and adjust the angle of the mirrors of the concentrator to accommodate the other required axis of motion to adjust for the seasonal variation of the solar position. Such solar collector systems utilized large concentrators employing a plurality of dynamic Fresnel reflector elements placed with each one aimed so rays coming from the sun are reflected to the receiver. The receiver could be arranged to move with the concentrator assembly, or be fixed with respect to the moving concentrator assembly. In the foregoing arrangement mirrors or other suitable reflective elements are attached to a mirror support assembly, which mirror support assembly is arranged and constructed to rotate about an axis so as to accommodate declination (or elevation) excursions of the sun. Multiple rows of such mirror support assemblies are aligned on a frame that is arranged to track the sun in Right Ascension (where the tracking axis is the polar axis), or azimuth (where the tracking axis is vertical), or other appropriate axis. For example, although not shown in any patents of which Applicants are aware, Power Kinetics, Inc., has in the past number of years designed and built many such solar collector systems which consist of dynamic Fresnel reflectors that have the focus/receiving means fixed to and move with the concentrator and wherein tracking mounts have ranged from altitude/azimuth and modified altitude/azimuth (tilted track) to the large (300 square meter) polar axis solar collector systems, such as illustrated in FIG. 1.

Although such prior art dynamic Fresnel type concentrator solar collector systems have operated entirely satisfactorily with respect to the ability to concentrate and collect solar energy, they have remained too expensive to manufacture and erect to be entirely acceptable for many promising near term commercial applications. For example, such systems require large piers to support the large concentrator, involve many foundations for both support piers and guy cables, usually require heavy equipment, such as cranes, for installation at the site and, where the receiver is large and heavy, such as for example in the case where the receiver is a large boiler or an engine, it is difficult even with the use of heavy and expensive structural members to achieve the desired rigid support for such receiver as the concentrator is moved to track the daily apparent movement of the sun. To prevent distortion, the concentrator frame must be made very strong and rugged which requires the use of heavy and expensive structural members. Very high performance components are required for the Right Ascension drive to handle the large forces without excessive lost motion. To prevent damage from typhoons or hurricanes when not in operation a separate stow locking system is required. Further, since the structure is suspended between two piers, all forces must be transmitted through the shafts and bearing connections at both ends of the central structural beam, and the concentrator assembly must be rigid enough at any attitude to accommodate dynamic wind gusts from any direction without inordinate distortion. Maintaining accurate tracking in windy regions is difficult.

It is also well known, that equatorial mounted, polar tracking solar collector systems are desirable since they have the advantage of a constant tracking rate at the earth's rotational speed (15 degrees per hour) and a slow seasonal movement about the declination axis (a maximum of 0.0163 degrees per hour at the equinoxes and zero at the solstices). Prior to the present invention, however, the advantage of this simple tracking has been offset by several disadvantages. One such disadvantage is that the mass of the concentrator must be supported on a tilted axis resulting in high thrust loading and moments which have required heavy and expensive supporting structures. Another is that the weight of the receiver distorts the concentrator frame to an increasing degree as the collector rotates east or west from the noon position in which the receiver is directly above the axis of rotation. Still further, with such prior art solar collector systems, it is difficult to design an accurate, low power, and inexpensive tracking mechanism, and one where the receiver and associated hardware can be easily lowered for maintenance. In addition, in many arrangements a plurality of rotatable unions or flexible connections are required between the receiver and the ground which further contributes to the cost.

Accordingly, there remains a continuing need to provide improved solar collector systems which are less expensive to manufacture and install, as well as the need for less expensive and lightweight tracking structures for such systems which can accommodate large concentrators while providing for rigidity, accurate tracking using a minimum of power, and be capable of withstanding or avoiding damage from the effects of severe weather and environmental conditions, including high winds, hail, ice, snow, and the like.

To be commercially acceptable for a wide range of commercial applications a solar radiation collector system should:
  be economical to manufacture and install;
  employ a support structure which is simple, strong, lightweight, and capable of supporting large concentrators, and also heavy receivers when required;
  be able to withstand extreme weather conditions, including severe winds, hail, ice, snow, and the like;
  provide accurate tracking with low power requirements;
  be easily modified to place the center of gravity on the axis of rotation for a variety of applications;

The present invention provides a new and improved tracking approach which allows a tracking solar collector system to achieve all of the foregoing desiderata, and overcomes one or more of the other problems and disadvantages of the known prior art systems.

SUMMARY OF THE INVENTION

It is an object of this invention to provide tracking structures for solar radiation collector systems having a main tension-compression support structure which is simple, strong, lightweight, and capable of rigidly supporting large concentrators and heavy receivers.

It is another object of this invention to provide tracking structures for solar radiation collector systems having a main tension-compression support structure which may be readily integrated with a simple, rigid drive for accurately following the sun even in the presence of strong buffeting winds.

It is another object of this invention to allow a few widely spaced foundations with simple interfaces to both rotatably support and anchor the structure.

It is yet another object of this invention to provide a tracking structure for solar radiation collector system having a main tension-compression support structure which may be constructed from identical, readily fabricated pieces which are easily assembled at the site.

It is a further object of this invention to provide a tracking structure for a solar collector system which can be easily and safely maintained.

Briefly stated, in accordance with one aspect of this invention there is provided new and improved two-axis tracking, structures for solar radiation collector systems and related systems comprising a stiff and lightweight main integral tension-compression support unit. The main tension-compression support unit includes a curved rim and structural means, which may be a concentrator frame, passing through the plane of the rim and connected to it. The system includes means connected between the rim and the frame for providing mutual stabilization of the rim and the frame. A plurality of transducer elements are carried by the frame and provide for a desired utilization of the solar radiation. The combination of the frame and the transducer elements carried by such frame form a solar concentrator assembly. The mutual stabilization means may be a plurality of tension members connected between the rim and the frame, one or more solar radiation transparent members made of a material such as, for example, a polycarbonate, an acrylic, or a fluoro polymer connected between the rim and the frame, or other suitable means connected between the rim and the frame and which will present a minimum of interference to the solar radiation. The transducer elements may be, for example, reflector or refractor type elements for directing the solar radiation to a suitable receiver or a plurality of receivers.

Alternatively, the transducer elements may be direct energy conversion devices, such as photovoltaic cells or the like. For use with conventional photovoltaic concepts, arrays of cells which utilize natural sunlight, or concentrating modules can be employed. The system further includes suitable ground support and stabilization means for rotatably supporting the main tension-compression support structure from the ground with stabilization in three dimensions and allowing for at least ninety degrees of rotation of the main support structure with respect to the ground. In accordance with the invention the support and stabilization means rotatably supports the rim on primarily one side of a diameter thereof and rotatably supports another point outside the plane of the rim to provide effective three dimensional stability.

A first drive means is provided for imparting a desired rotational movement to the main support structure to effect a desired primary tracking motion to adjust for the apparent motion of the sun. The system further includes a second drive means for moving the transducer elements to provide for a second adjustment for the apparent motion of the sun. When the transducer elements are reflecting or refracting elements, the system also includes a suitable receiver disposed at the point of focus for receiving the radiation. Direct energy conversion devices constitute their own receiver. For a solar collector system the receiver would be connected with the main support structure and would move with it, whereas for a solar furnace or a heliostat the receiver would be fixed at a desired location independent of the main support structure.

Conveniently, the system may include an axis beam extending through the center of the curved rim, connected to the frame and having hubs disposed near opposite ends thereof, and with at least one such hub allowing the axis beam and associated structure to rotate with respect to its foundation. In an equatorially mounted system, the frame and the axis beam are disposed parallel to the earth's axis and thus the axis beam can be said to have a polar end and an equatorial end. In such an equatorial mounted system, locating the rotatably mounted hub at the equatorial end is usually most convenient.

BRIEF DESCRIPTION OF THE DRAWINGS

The foregoing and other objects, features, and many of the attendant advantages of the present invention will become apparent and better understood upon a reading of the following detailed description considered in conjunction with the accompanying drawings, in which like reference characters may designate the same or similar parts throughout the figures thereof and wherein:

FIG. 5 is a view taken along the line 5—5 of FIG. 4 showing details of the differential cable drive mechanism.

FIG. 6 is a section view taken along the line 6—6 of FIG. 5 which more clearly shows the pulleys and the routing of the drive cable thereon.

DESCRIPTION OF THE PREFERRED EMBODIMENTS

Figure 1:
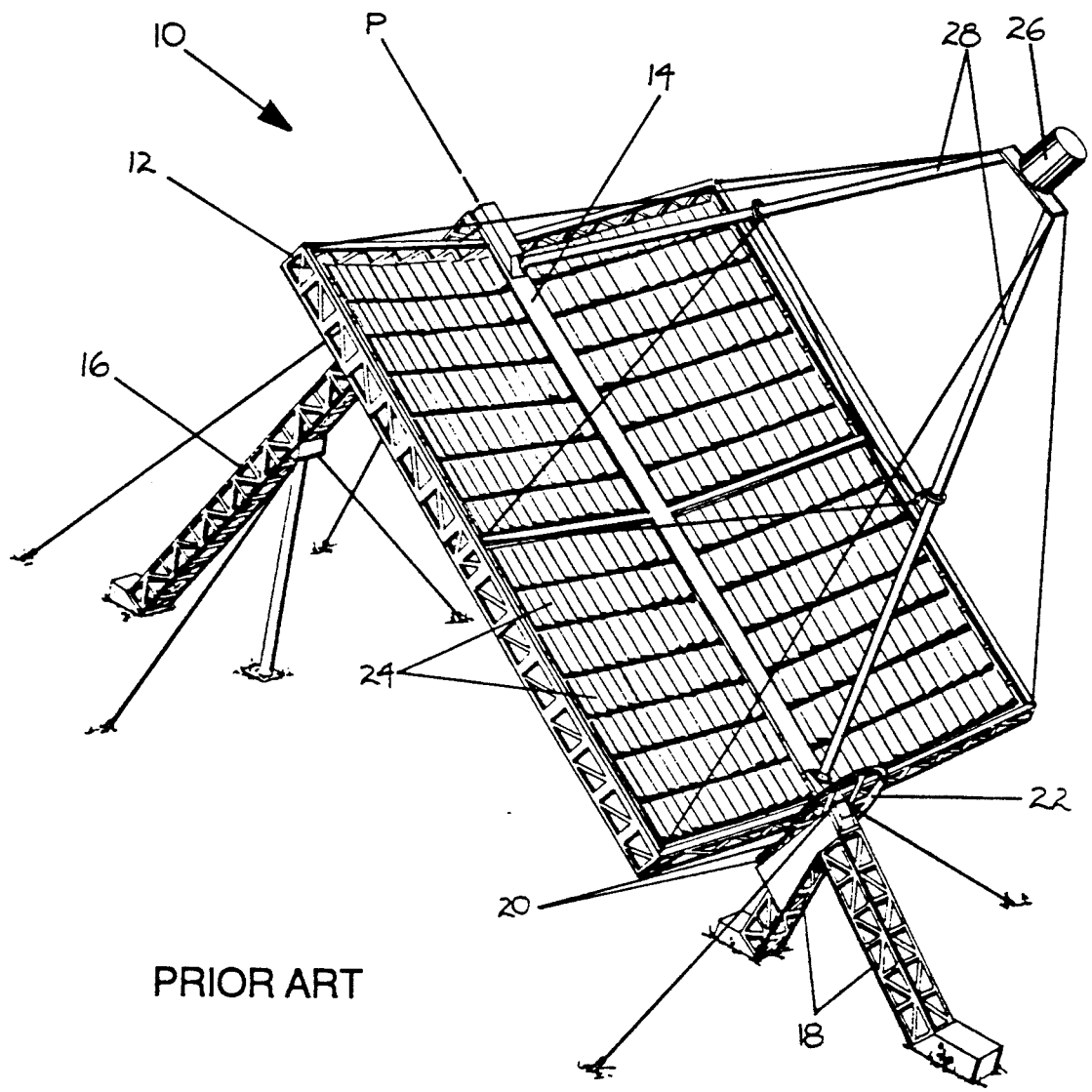
FIG. 1 is a perspective view of a prior art two-axis tracking, solar collector system of the type which follows the daily apparent movement of the sun by rotating the concentrator assembly on one axis, and adjusts the angle of the mirrors of the concentrator assembly to accommodate the other required axis of motion for seasons.

Referring now to the drawings, there is illustrated in FIG. 1 a prior art two axis tracking, point-focusing solar collector system of the type previously designed and built by Power Kinetics, Inc., the assignee of this invention. As shown, the solar collector system 10 comprises a large (e.g. 300 square meter) concentrator assembly 12 including a central structural beam 14. The concentrator assembly 12 is mounted for rotation about the polar axis P by a pier 16 (Polar end) and a pier 18 (Equatorial end) disposed at opposite ends of the central structural beam 14. A Right Ascension drive means 20, which includes a drive wheel 22 fixed to the equatorial end of the central structural beam 14 and coupled by a drive chain to a motor and gear box fixed to the pier 18, provides for rotation of the concentrator 12 to allow for tracking of the daily apparent movement of the sun. To provide for the second required axis of motion to adjust for seasonal and operational considerations, the concentrator 12 is provided with a plurality of dynamic reflector elements 24 supported and positioned to provide a Fresnel reflective paraboloidal surface and are arranged to be rotated about an axis perpendicular to the polar axis (the Declination Axis). A receiver 26 is mounted at the point of focus of the concentrator 12 on a plurality of booms 28 which connect the receiver to the central structural beam 14. The system also includes the usual controls and a suitable utilization means such as an engine or other heat utilization means, all of which are well known in the art.

As indicated previously, although such prior art two-axis tracking, dynamic Fresnel type concentrator solar collector systems have operated entirely satisfactorily with respect to the ability to concentrate and collect solar energy, they have remained too expensive to manufacture and erect to be entirely acceptable for many promising near term commercial applications. For example, such systems require large piers and many foundations to support the large concentrator and to stabilize the collector against buffeting winds all of which contribute to the cost, and where the receiver is large and heavy, such as for example in the case where the receiver is a large boiler or an engine, it is difficult even with the use of heavy and expensive structural members and guy cables to achieve the desired rigid support for such receivers and the concentrator as the structure is moved to track the daily apparent movement of the sun.

Figure 2:
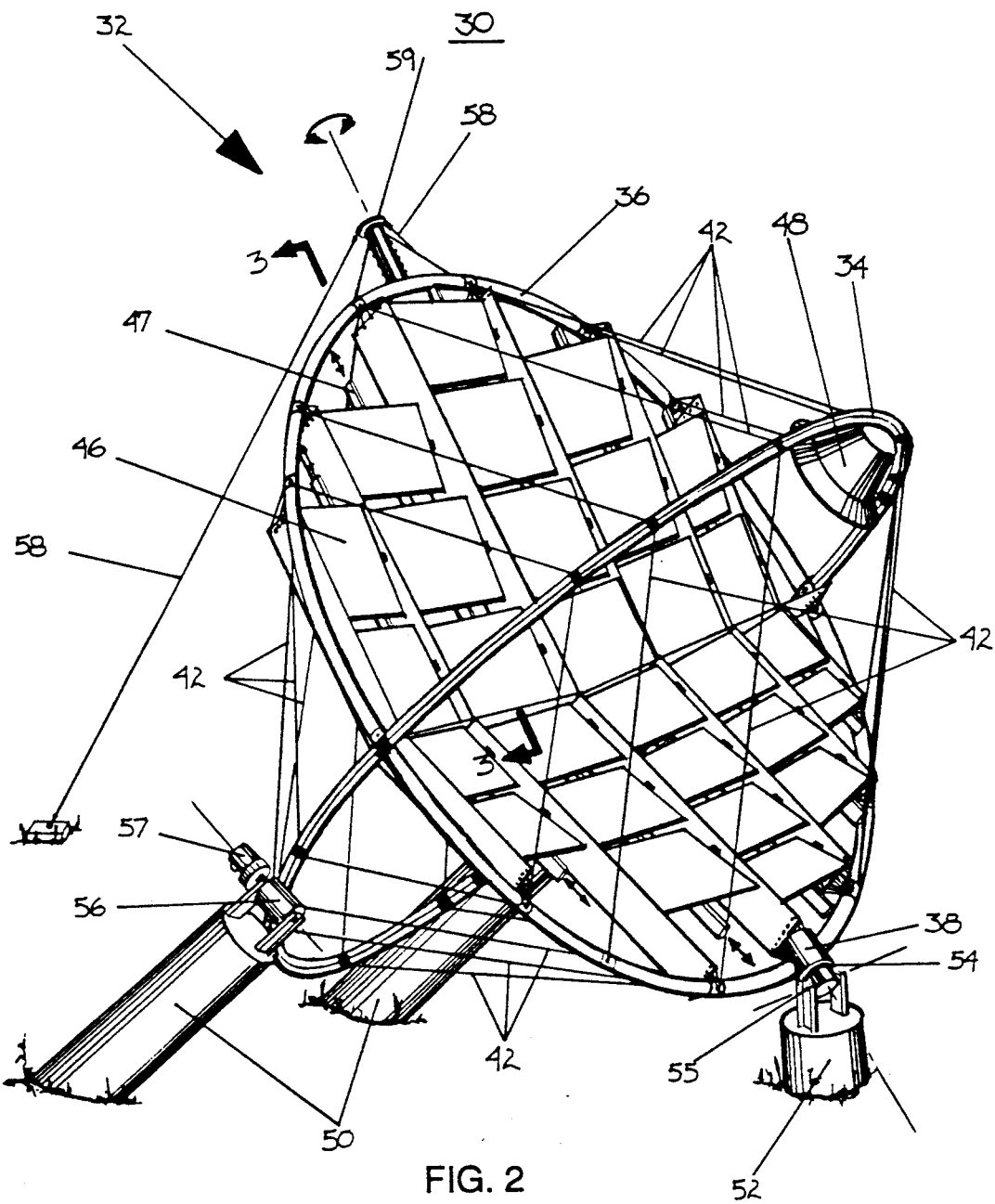
FIG. 2 is a perspective view of a two-axis tracking, open lattice, tension-compression solar radiation collector system in accordance with one embodiment of the present invention.

FIG. 2 illustrates a two-axis tracking, point focusing, solar collector system 30 in accordance with one embodiment of this invention. The invention is shown as an equatorially oriented structure wherein the system has two axes of motion; one, the polar axis, being parallel to the earth's axis and the other, the declination axis, in planes perpendicular to it. As previously stated, the invention will be described in detail as an equatorially oriented structure and system, however, it is to be understood that this is merely for convenience and that the invention is not limited to this orientation and can be arranged in any other suitable orientation, such as for example, azimuth/altitude, or the like.

Figure 4:
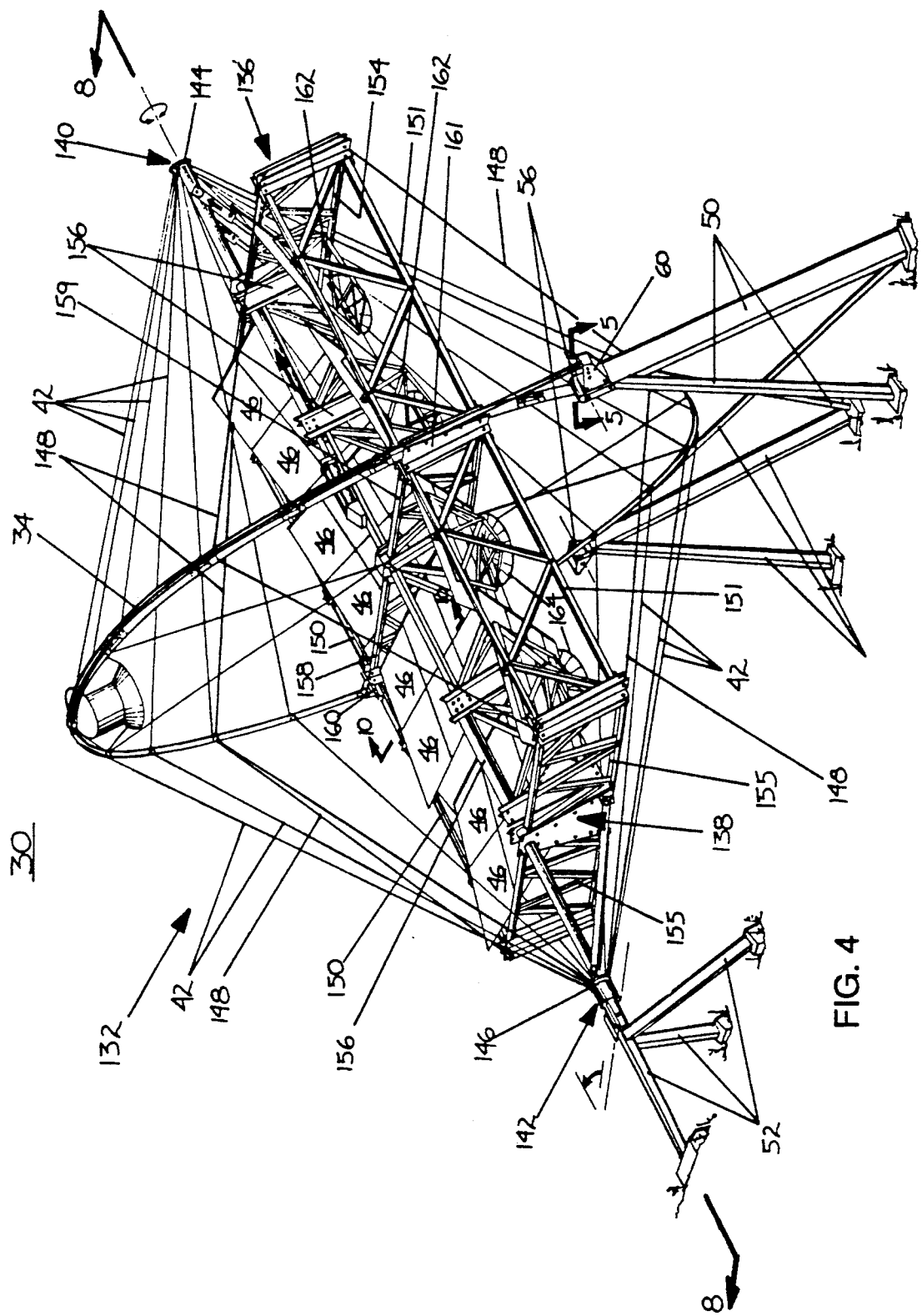
FIG. 4 is a perspective view of an open lattice, tension-compression solar collector system employing a rectangular type concentrator frame in accordance with another embodiment of of this invention.

The solar radiation collector system 30 comprises a stiff and lightweight, open lattice, bicycle wheel-type, tension-compression, main support structure 32. The main support structure is formed of a curved rim 34, a structural means, shown as a concentrator frame 36 adapted for carrying a plurality of transducer elements, disposed parallel with the earth's axis, passing through the plane of the rim 34 and rigidly connected to it, and a hub 38 connected with the concentrator frame 36 and disposed outside the plane of the rim 34. The structural means 36 is shown as being of elliptical configuration, however, it may be round, rectangular, or of any other desired suitable shape (FIG. 4). Hub 38 is shown connected to one end of the frame 36, however, it may be connected with the main support structure in any other suitable manner so that hub 38 is connected rigidly with the main support structure 32, along the axis of rotation of the rim and disposed outside the plane of the rim 34.

Rim 34 and frame 36 are connected together in any suitable manner to provide for mutual stabilization of the rim and the frame. Preferably, the tension-compression concept of a bicycle wheel is employed and the rim 34 and frame 36 are connected together by a plurality of main tension members 42, which are selected, arranged and constructed so as to minimize shadows or other interference with the solar radiation falling on the transducer elements carried by the frame 36. Conveniently, the main tension members 42 may be suitable wires, cables, thin webs, or the like, connected in a distributed manner between the rim 34 and the frame 36. Accordingly, when wires or cables are employed they can be of small diameter thereby providing for a mutually stabilized, lightweight, stiff, open lattice structure which presents little shadow effect to the transducer elements carried by the frame 36. For example, the tension members may be on the order of 1/1,000 of the diameter of the overall device. For example, in one solar collector system in accordance with this invention wherein the curved rim 34 had a diameter of 7 meters and carried a concentrator with an area totaling 25 square meters, the main tension members 42 had a diameter of about 2.5 millimeters. Preferably, the main tension members 42 are arranged and constructed so that the forces on the polar half of the concentrator frame 36 are symmetric with the forces on the equatorial half.

Although illustrated as being provided by small diameter tension members 42 connected at spaced apart points about the rim and the frame, the desired mutual stabilization may be provided by any suitable means connected between the rim 34 and the frame 36 which is light in weight, minimizes shadows and offers negligible interference to the solar radiation falling on the transducer elements 46. For certain applications, for example, the use of one or more members made of a suitable transparent plastic, such as a polycarbonate, an acrylic, a fluoro polymer, or other suitable solar radiation transparent material may be employed to provide the desired mutual stabilization.

Figure 13:
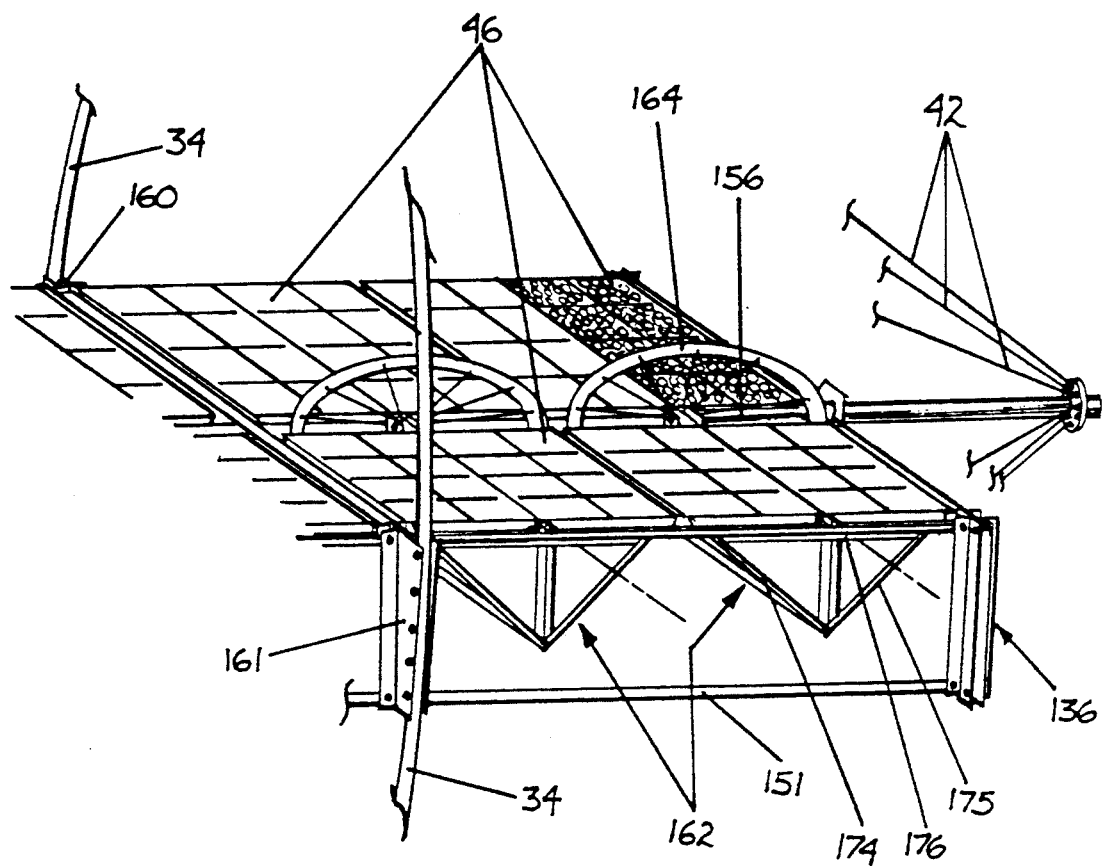
FIG. 13 is a fragmentary perspective view of a concentrator frame assembly wherein the transducer elements are direct energy conversion devices.
Figure 14:
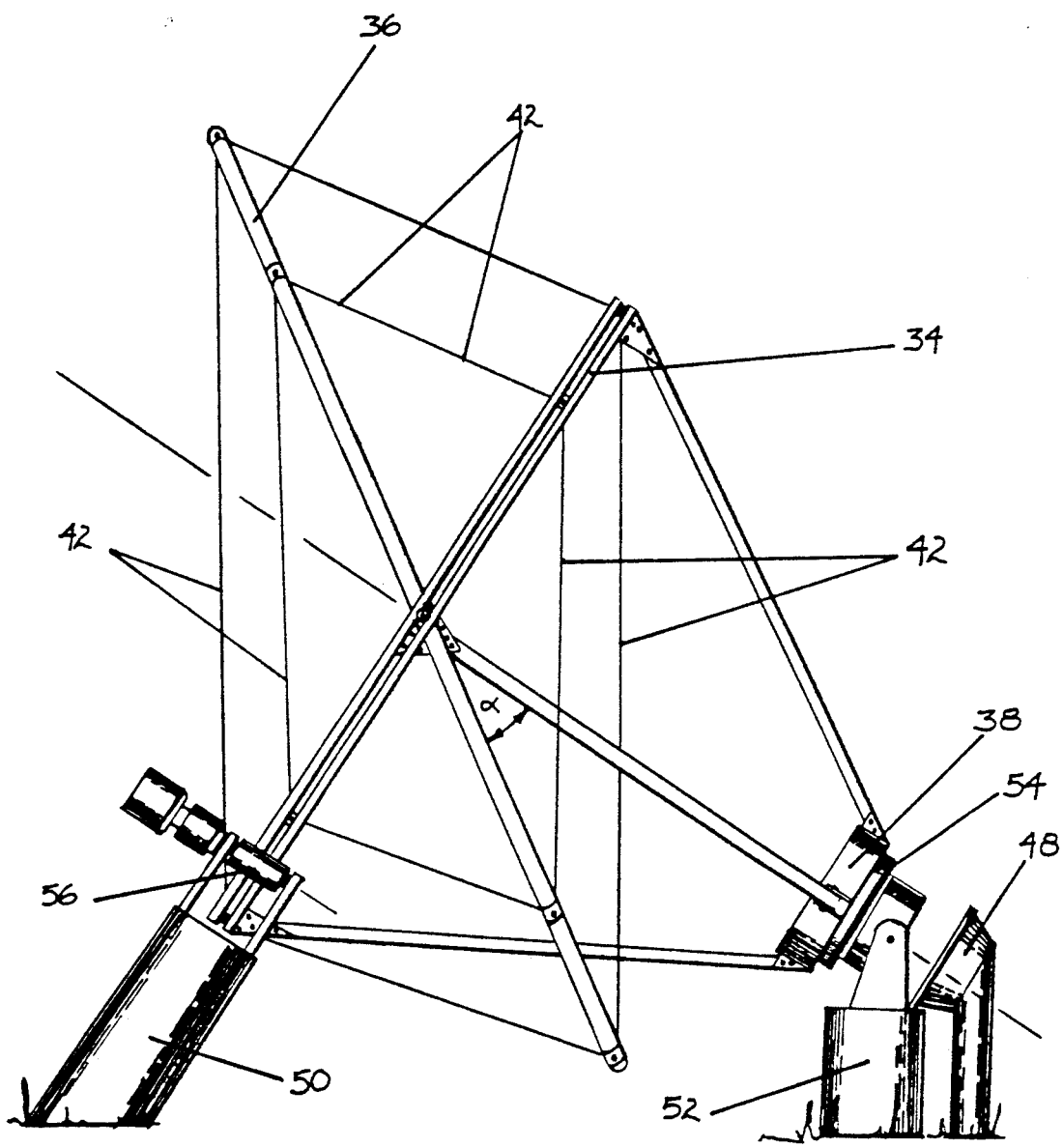
FIG. 14 is a schematic perspective view of a solar radiation collector system in accordance with this invention arranged as a solar furnace wherein the receiver is fixed along the axis of rotation of the main supporting structure near the equatorial end thereof, and independent of the main support structure.
Figure 15:
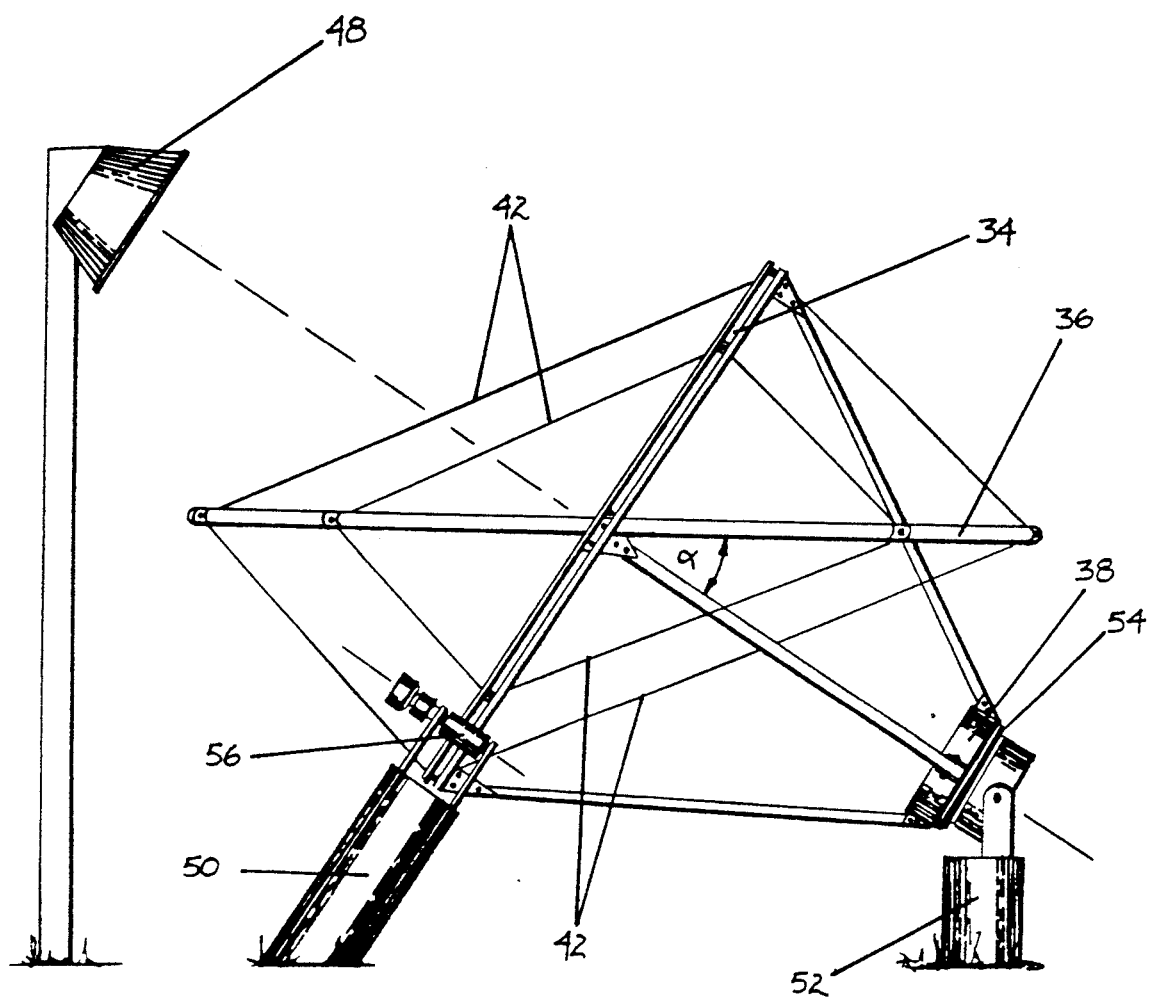
FIG. 15 is a schematic perspective view of a solar radiation collector system arranged as a solar furnace in accordance with another embodiment of this invention wherein the receiver is fixed along the axis of rotation of the main support structure near the polar end thereof and independent of such main support structure.

A plurality of solar radiation transducer elements 46 are carried by the frame 36 to provide for a desired utilization of the solar radiation. The transducer elements 46 are shown as reflector elements but could also be refractor elements (FIG. 12), or direct energy conversion devices such as photovoltaic cells (FIG. 13). Reflective transducer elements 46 are supported and positioned on members 43 connected with frame 36 to provide a Fresnel reflective paraboloidal surface. The system can be provided with a suitable receiver 48 connected to the rim 34, as shown, so as to move with the main support structure 32. Receiver 48 is arranged for receiving the solar radiation directed to it from transducer elements 46. As is well known, in the case of a solar furnace (FIGS. 14 and 15), or a heliostat (FIG. 16) the receiver 48 may not be connected to move with the main support structure but could be fixed at a selected point independent of the main support structure. The optics required for refractive and direct energy transducers, determine the optimum configuration for these kinds of elements.

A desired primary tracking motion (Right Ascension) to adjust for the apparent motion of the sun is provided by causing the main support structure to be rotated with respect to the ground. As will be described in more detail later, this is preferably provided by a differential cable drive of the type shown and described in co-pending application Ser. No. 07/833,940 entitled DIFFERENTIAL DRIVE, filed concurrently with this application, assigned to the same Assignee as this invention, and which description is incorporated herein by reference. However, the main support structure 32 may be caused to be rotated by a friction drive, a gear drive, a chain drive, or any of the other known types of drive arrangements which are suitable and capable of imparting rotational movement to the main support structure with respect to the ground.

To provide for the second motion (Declination) to adjust for the seasonal changes in the solar position, the entire reflective surface made up of the plurality of Fresnel transducer elements 46 may be pivotally or otherwise movably mounted so as to be capable of being moved within the frame 36. Also, for solar furnaces and heliostats it may be advantageous and straightforward to move the reflector elements as a single group.

Preferably, instead of moving the entire assembly of transducer elements 46, or the moving of the entire reflective surface, the transducer elements 46 are arranged and constructed to provide for the selective movement thereof with respect to the frame 36. That is, the reflective surface is of the dynamic Fresnel element type wherein the Fresnel mirrors, or other suitable transducer elements 46, are arranged to be selectively moved to adjust for the seasonal variation of the solar position.

The transducer elements 46 can be located in a single plane, in a few planes, in any symmetrical pattern, or in a random arrangement. Individual transducer elements simply must be able to be oriented so that the sunlight is directed to the focal point. Structural and design criteria promote simplicity afforded by dividing the concentrator into two planes of transducer elements. With the optimum bank angle, the average transducer element support assembly is tangent to a circle with the center on the optical axis of the concentrator at twice the focal distance. This arrangement maximizes the active area by minimizing shading/blocking effects and clearance required between the movable transducer elements or their support assemblies.

Transducer elements 46 may be of the reflector type described and claimed in U.S. Pat. No. 4,682,865, which patent is assigned to the same assignee as the present invention. The transducer elements 46 are arranged and positioned to provide a Fresnel reflective paraboloidal surface for reflecting the sun's rays to a receiver 48. Because the receiver 48 is typically on the optical axis of the system 30 only at equinox in an equatorially oriented structure, the reflective surface, or the mirror facets, or other transducer elements thereof must be adjusted to function properly at other times of the year. Conveniently, this can be achieved by mounting the transducer elements on suitable supporting assemblies which are disposed within the frame 36 and provided with drive means for selectively moving the transducer elements. The drive means can employ machine elements based on wheels or levers, can employ a cable wrapped around suitable wheels connected with each of the transducer element supporting assemblies, or other suitable drive means which will effect the desired selective movement of the transducer elements.

Figure 3:
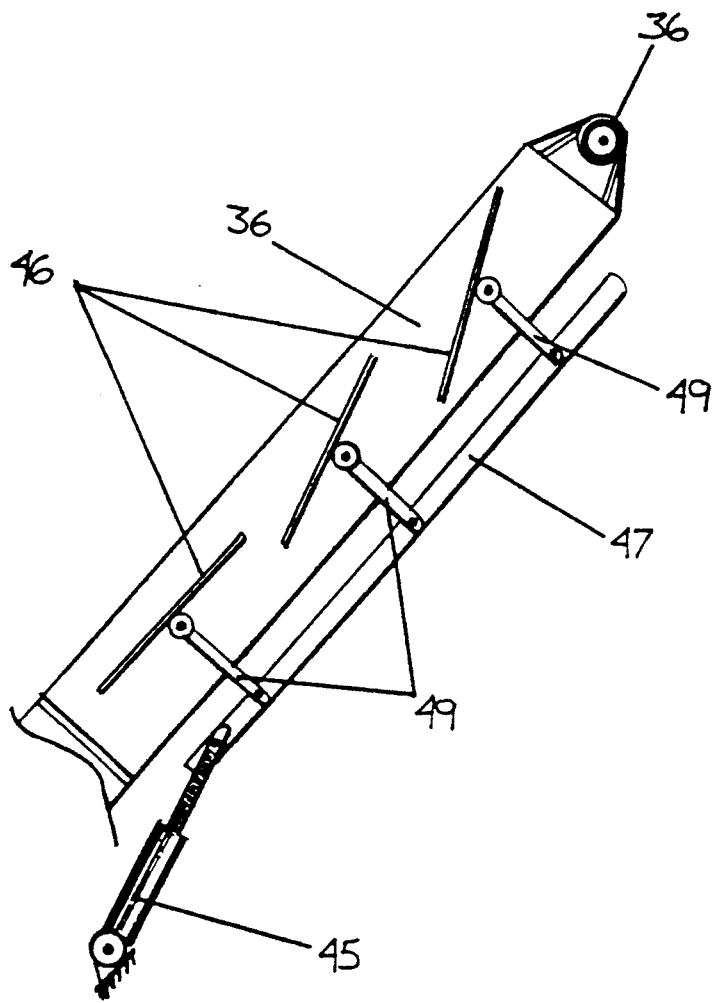
FIG. 3 is a section view taken along the line 3—3 of FIG. 2 showing an arrangement for selectively moving the transducer elements.

As illustrated in FIG. 2, the transducer element supporting assemblies are mounted within the frame 36 and, as shown in FIG. 3, include suitable articulated linkage means for selectively moving the transducer elements 46 supported thereon. In FIG. 3, a linear actuator 45 is connected to the transducer element supporting assemblies by the rod 47 and cranks 49. Movement of the rod 47 by the linear actuator 45 causes the selective movement of the transducer elements 46 to adjust for the seasonal solar position. Alternatively, the transducer element supporting assemblies may be mounted within the frame 36 so as to be rotatable about an axis perpendicular to the polar axis to provide for the selective movement of the transducer elements 46 to adjust for the seasonal solar position as will be described later in connection with the embodiment of FIG. 4.

As shown in FIG. 2, the main support structure 32 is provided with ground support and stabilization means for rotatably supporting the main support structure 32 from the ground with stabilization in three dimensions, and to allow for rotation of at least ninety degrees with respect to the ground to provide for the primary tracking motion to adjust for the apparent motion of the sun and for operational considerations. Preferably, for operational and other considerations, the system should be capable of being rotated at least 270 degrees.

Rim 34 is arranged to be supported on only one side of a diameter thereof and rotatably supported at another point along the axis of rotation and outside the plane of the rim 34. As shown, the main support structure 32 is rotatably supported by a plurality of spaced apart rim support piers 50 which are arranged and constructed to rotatably engage and support the rim 34 at circumferentially spaced apart locations on rim 34, as well as by a hub support pier 52 which is rotatably coupled to the hub 38 through a suitable bearing, indicated generally at 54. Conveniently, the rim support piers 50 are provided with suitable rollers 56 which provide for rolling contact with the rim 34. The spaced apart rim support piers 50 and the hub support pier 52 provide for a wide footprint, triform support for distributing the weight of the main support structure and components mounted therein along with any ice and snow, as well as the wind forces intercepted by the main support structure 32, directly into the ground.

It will be understood that for smaller size solar furnace systems in accordance with this invention, for example, the rim support piers 50 are often not required and the entire support and three dimensional stabilization can be provided by a single support pier 52 rotatably coupled with the hub 38 through the bearing 54.

To simplify the erection of the system and obviate the need for the use of heavy machinery, such as cranes, the main supporting structure 32 may be arranged to be pivotally mounted to the hub support pier 52. As shown, the extending end of support pier 52 is bifurcated and the hub 38 is arranged to be positioned in the bifurcated end and pivotally mounted therein by suitable shaft means, such as bolt 55. By first mounting the equatorial hub 38 on its equatorial support pier 52 and allowing it to pivot on a horizontal axis, the support structure 32, together with the concentrator frame assembly 36 which is mounted therein, can be erected without the need for a crane or other heavy construction equipment. For example, two jacks or forklifts, one on each end of the frame can provide the lift and stability (against wind gusts) required until the bottom half of the rim is installed.

The desired primary tracking motion to adjust for the apparent motion of the sun is provided by causing the main support structure to be rotated in a controlled manner with respect to the ground. The main tension-compression support structure 32 is arranged to be driven from the rim 34 by a suitable Right Ascension drive means providing for a large mechanical advantage drive for the main support structure 32. Any of the known prior art drive arrangements, such as friction drives, gear drives, chain drives, and the like may be employed for this purpose.

A suitable friction type drive arrangement may be readily provided as illustrated in FIG. 2 by suitably powering the rollers 56 only one of which is visible. As shown, rollers 56 may be treaded with a suitable material such as rubber and arranged to be rotated by a suitable motor and gear reduction unit 57 so that the rollers not only provide for the desired rotatable support for the rim 34 but also provide a simple friction-type drive to impart a desired rotation to the main support structure 32. The power driven rollers 56 act directly on the rim 34 and impart rotational torque through the rim 34 to the main support structure 32. To prevent uplift, one or more anchor cables 58 may be provided for securely holding the support structure 32 firmly to the power driven rollers 56. The anchor cables 58 may be connected through a suitable bearing 59 connected near the polar end of the frame 36 so as to allow for rotation of the main support structure 32. Such anchor cables assure that the rim is held tightly and in good friction driving contact with the powered rollers 56. Further, in order to insure that wind induced uplift does not reduce traction, powered rollers 56 should be provided at each of the rim support piers 50. Alternatively, the friction drive may employ a cable or band wrapped around the rim 34 with separate friction drive wheels. Friction type and other suitable drive arrangements such as gear drives, chain drives, and the like are well known in the art and no further detailed description is deemed necessary or desirable for a full understanding of this invention.

Preferably, the Right Ascension drive means is a differential drive system of the type shown and described in co-pending application Ser. No. 07/833,940 entitled: DIFFERENTIAL DRIVE employing a chain, cable, strap, or other suitable flexible force transmitting element. Such application is filed concurrently with this application, is assigned to the same Assignee, and the description thereof is incorporated herein by reference.

Although the foregoing referenced differential drive is the preferred drive arrangement for all of the various embodiments of the present invention, for convenience it will be shown and described in detail only with respect to the embodiment of the invention illustrated in FIG. 4. Further, although in the drawings and the following description the flexible force transmitting element is illustrated as being a flexible cable, this is for convenience and simplicity of description only and it is to be understood that any other suitable flexible force transmitting element, such as linked or roller chain, belt, or the like may be employed.

FIG. 4 illustrates a solar radiation collector system in accordance with another embodiment of the invention. As shown, the system 30 includes a main bicycle wheel-type tension-compression structure which is similar to the main support structure 32 shown in FIG. 2. The main tension-compression support structure includes a rim 34 and a rectangular concentrator frame assembly passing through the plane of the rim 34 and rigidly connected to it. Since the embodiment illustrated in FIG. 4 shows the preferred differential drive arrangement for providing the Right Ascension drive for the solar radiation collector system, such drive system will now be generally described with the more detailed description of the embodiment of FIG. 4 to follow later.

Briefly, the differential drive illustrated includes an endless loop of flexible cable, a pair of direction turning pulleys, a differential escapement means, which includes a differential pulley and a means for maintaining the flexible cable in driving engagement with the differential pulley, and with the endless loop of flexible cable drivingly interconnecting the pulleys so that force applied to the flexible cable produces a ratioed amount of relative movement between the turning pulleys and the differential escapement means. The means for maintaining the flexible cable in driving engagement with the differential pulley is conveniently provided by one or more idler pulleys.

Accordingly, as shown more clearly in FIGS. 4 through 9, the differential drive system 60 comprises a frame 61 carrying a motor 62 coupled to and driving a gear reduction unit 64, preferably a worm gear type gear reduction unit. A differential pulley 68 is fixed to the shaft 70 of gear reduction unit 64. Drive pulley 68 has a major diameter region 72, and a slightly smaller, minor diameter region 74. For many applications the difference between the major diameter and the minor diameter regions of differential pulley 68 may be extremely small. For example, in one such system where differential pulley 68 turned at 20 RPM, the major diameter 72 was 150 millimeters and the minor diameter 74 was about 6 millimeters smaller. The resultant motion of the main support structure was one revolution per two hours, or twelve times the apparent speed of the sun. The differential drive system 60 also includes one or more idler pulleys rotatably supported in the frame 61. In the drawings there are shown two idler pulleys, 76 and 78, one on either side of the differential pulley 68, and suitably rotatably mounted within the frame 61. Both regions 72 and 74 of differential pulley 68 and the idler pulleys 76 and 78 are shown as having multiple grooves, however, for many applications pulleys each having only one or two grooves will be entirely satisfactory. Also, although a gear reduction unit 64 is illustrated, it should be understood that for many applications no such gear reduction unit will be required and the differential pulley 68 can be fixed directly to the shaft of the motor.

Figure 7:
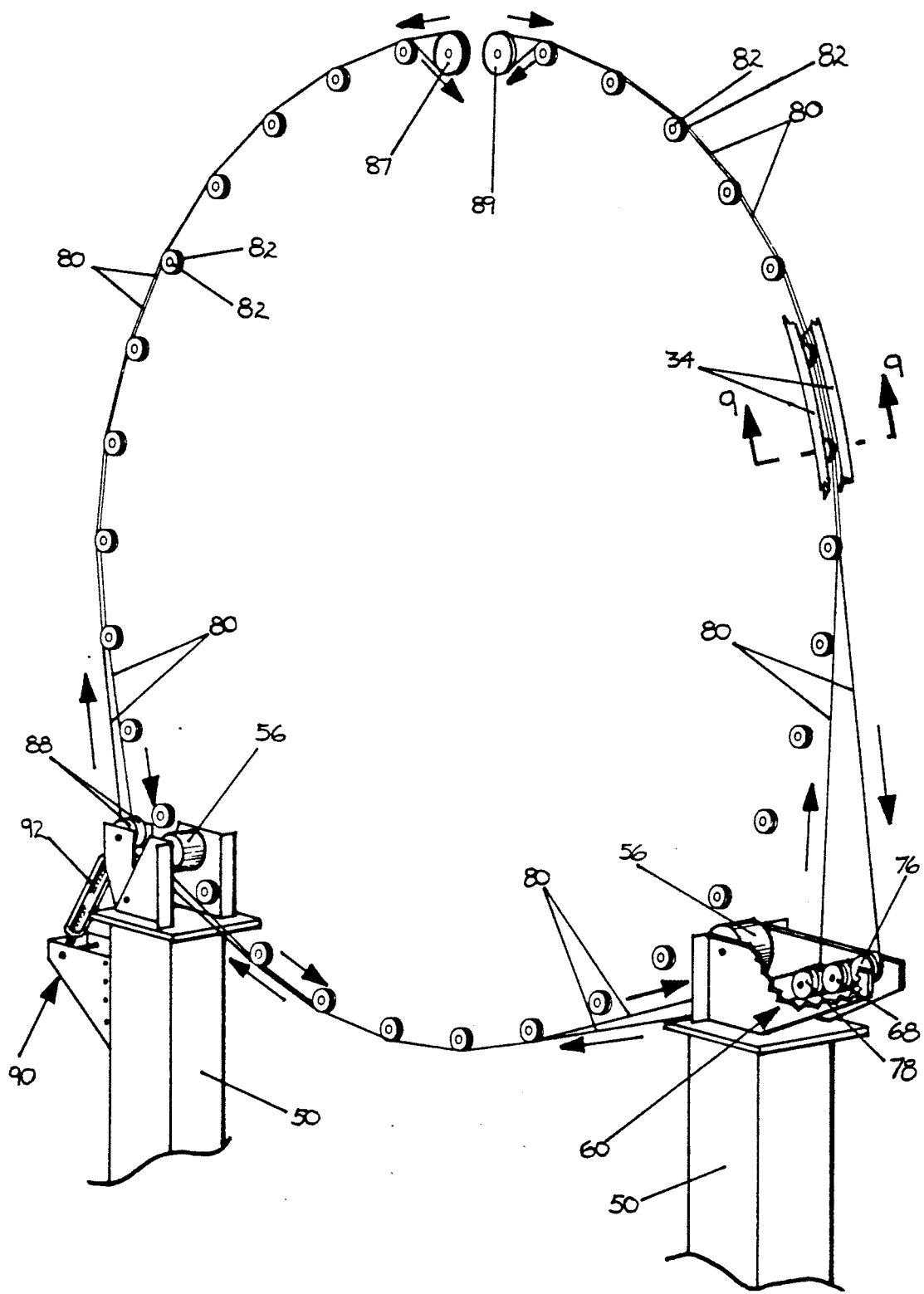
FIG. 7 is a diagrammatic sectional view illustrating the general connection and routing of the drive cable with the rim, the drive, and other pulleys associated with the differential cable drive system limited to around 200° of motion and wherein the turning pulleys are located on the moving structure.
Figure 9:
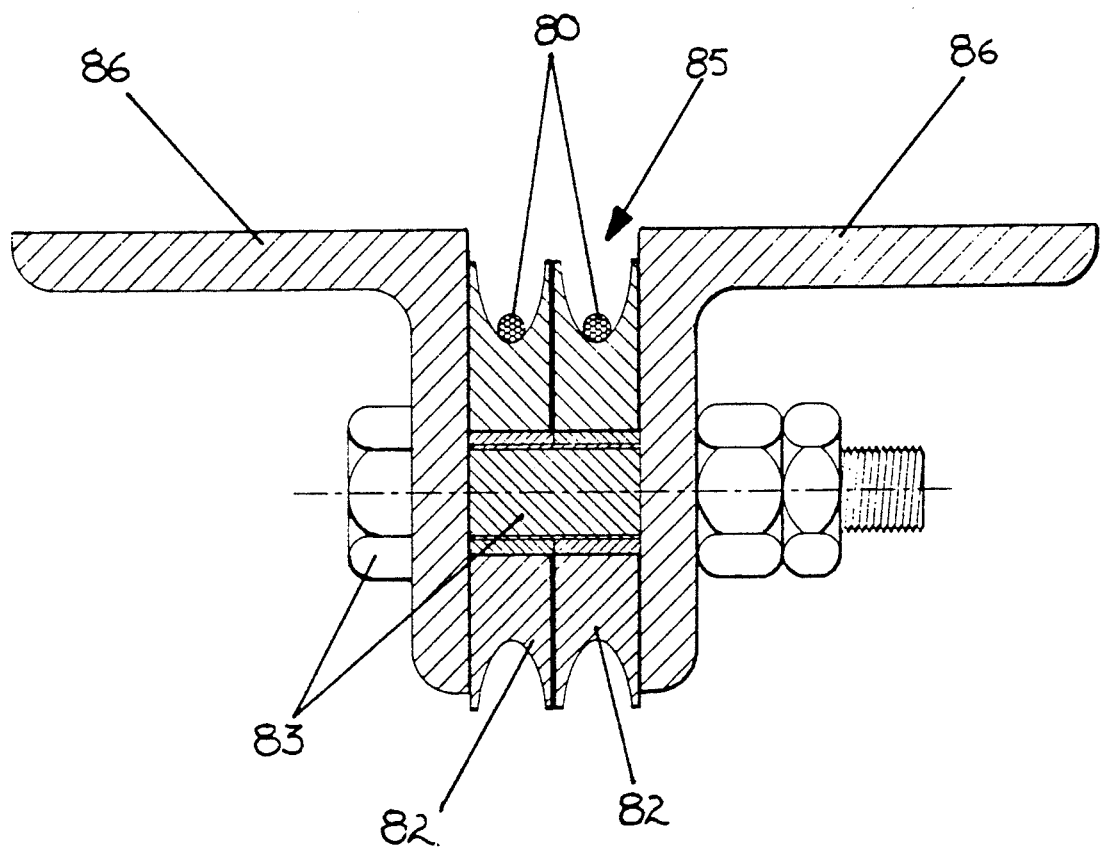
FIG. 9 is a sectional view taken along the line 9—9 of FIGS. 7, 7A, and 8 and showing one suitable arrangement of the cable guide pulleys mounted within the rim.

As shown more clearly in FIG. 7 an endless loop of drive cable 80 passes over the rim 34 and drivingly engages a plurality of guide means connected with the rim 34. In the arrangement shown, this means is provided by small guide pulleys 82 connected with the rim 34. The pulleys 82 may be arranged to be rotatably mounted in the rim 34 as shown more clearly in FIG. 9. As illustrated in FIG. 9 the rim 34 may be constructed from two suitably shaped sections, which may be angle sections 86, arranged in spaced-apart, side by side relationship to provide for a small space 85 between them. The guide pulleys 82, each having one or more grooves, are suitably mounted on a shaft 83 within this space 85 and extend to just inside the outer surface of the rim 34 so as to provide for rolling and guiding contact for the drive cable 80 and without interference with the rollers 56 at the rim support piers 50. The east and west parts of the cable loop pass around direction turning pulleys 87 and 89 which are secured to the rim 34. The size of the cable 80 and the number of grooves in the different diameter regions 72 and 74 of differential pulley 68 and idler pulleys 76 and 78 are determined by the forces required for driving and holding the main support structure 32 and its loads, and the coefficient of friction between the drive cable 80 and the differential pulley 68. For example, in the foregoing referenced system wherein rim 34 had a diameter of 7 meters, the drive cable had a diameter of 3 millimeters.

Figure 20:
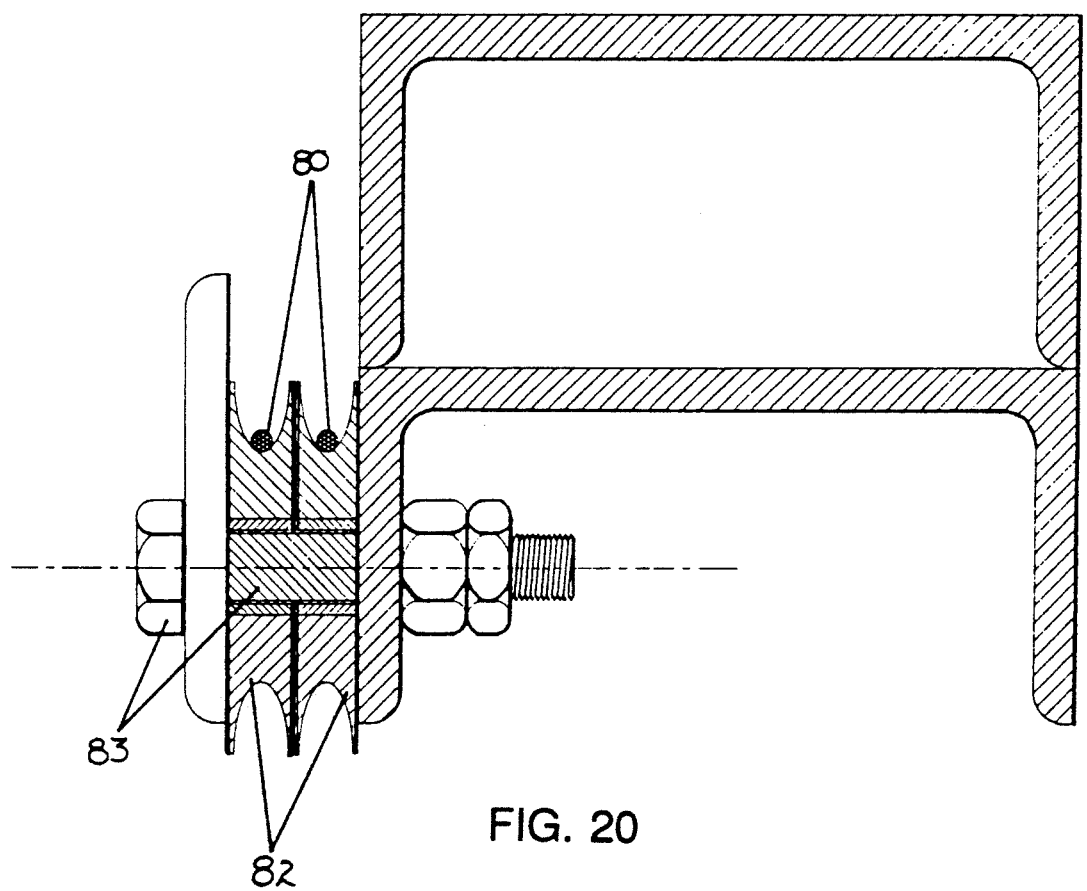
FIG. 20 is a sectional view of alternative construction to those illustrated in FIG. 9 and showing cable guide pulleys mounted on the side of a monolithic rim.
Figure 21:
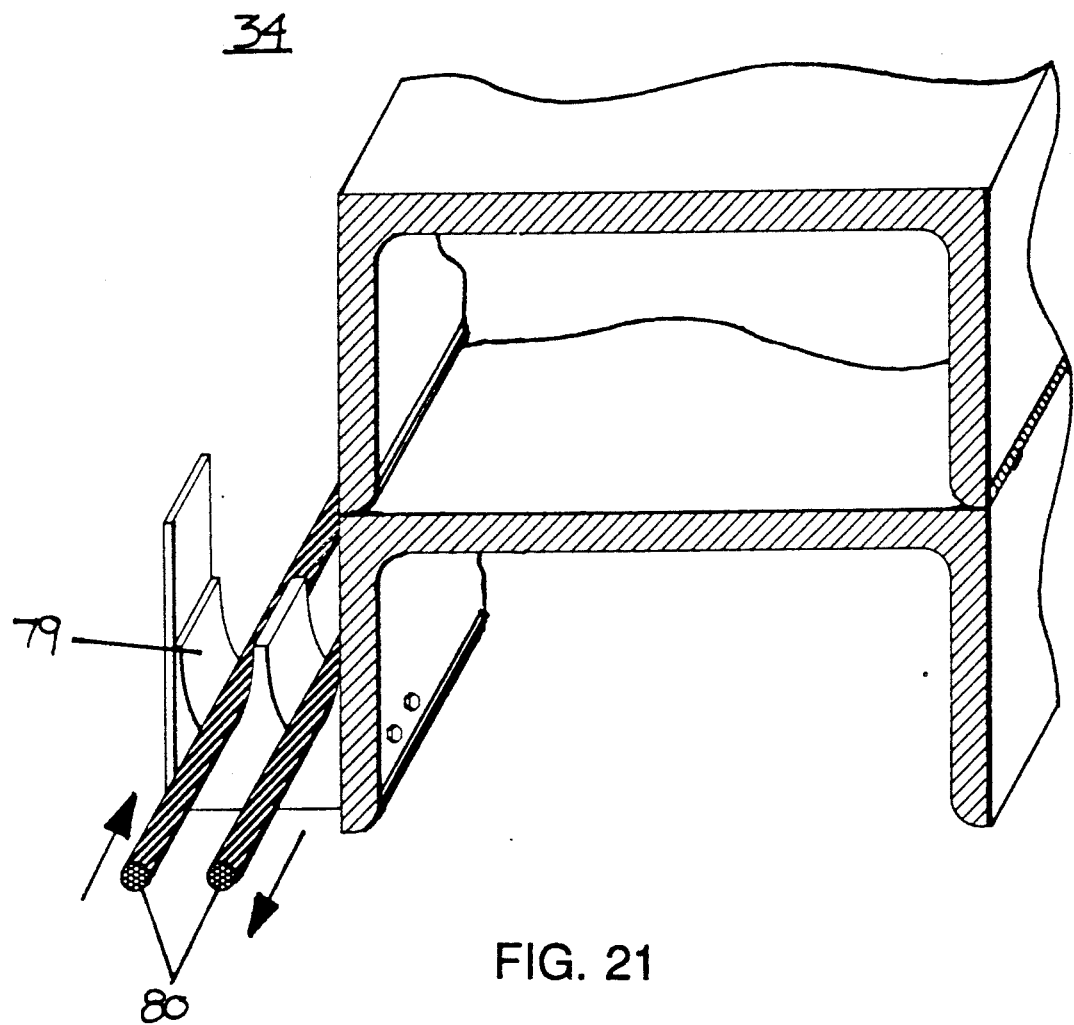
FIG. 21 is a perspective sectional view of alternative construction to those illustrated in FIG. 20 and showing a cable guide block mounted on the side of a monolithic rim.

The monolithic rim 34 illustrated in FIGS. 20 and 21 requires that the cable guides (wheels 82 in FIG. 20 and guide block 79 FIG. 21) be attached on the side of the rim 34. The use of guide blocks 79 may be appropriate where high duty cycles and long life are not required.

Figure 7A:
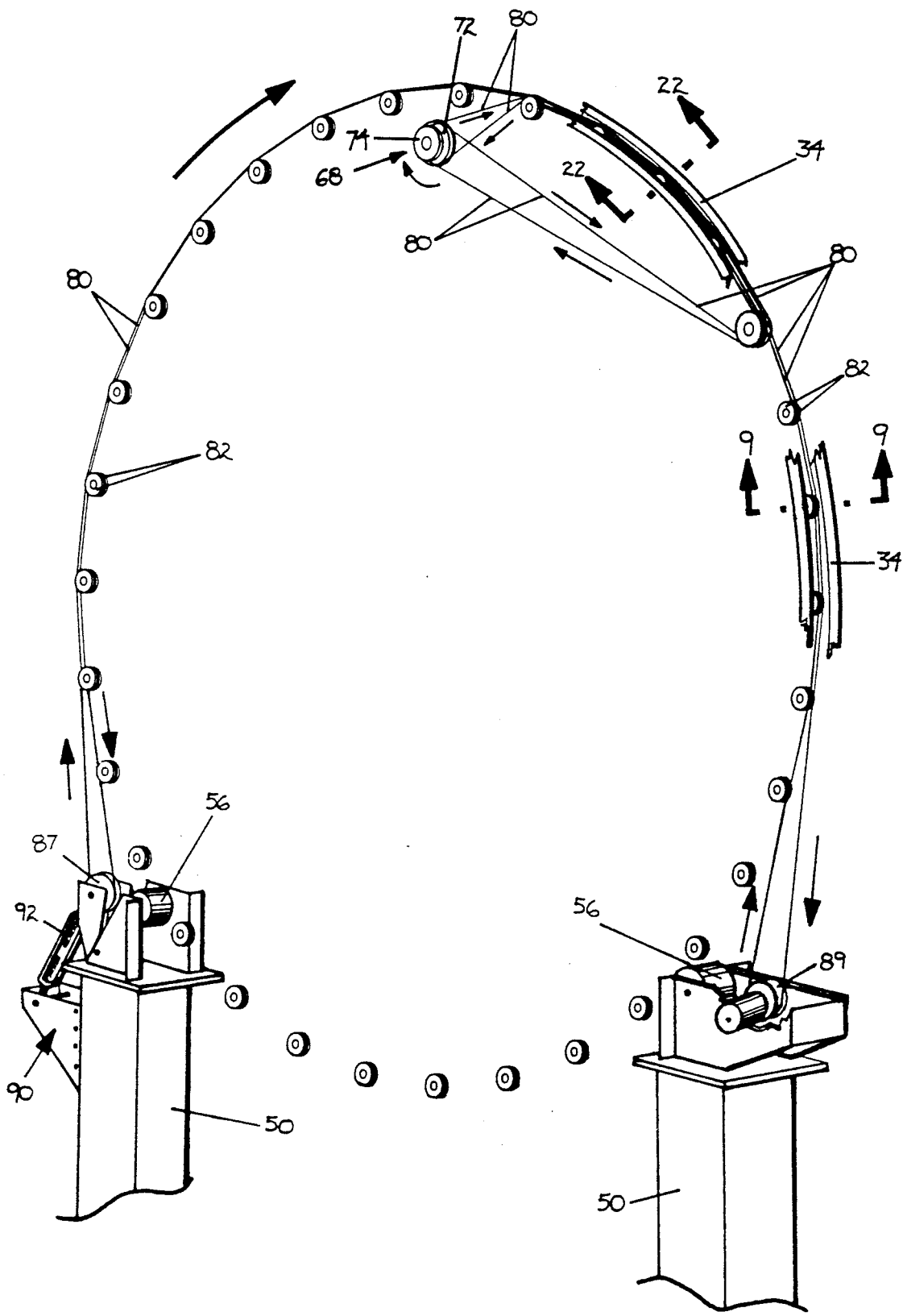
FIG. 7A is also a diagrammatic sectional view illustrating the general connection and routing of the drive cable with the rim, the drive, and other pulleys associated with the differential cable drive system allows more than 270° of rotation and wherein the turning pulleys are attached to the foundations.
Figure 22:
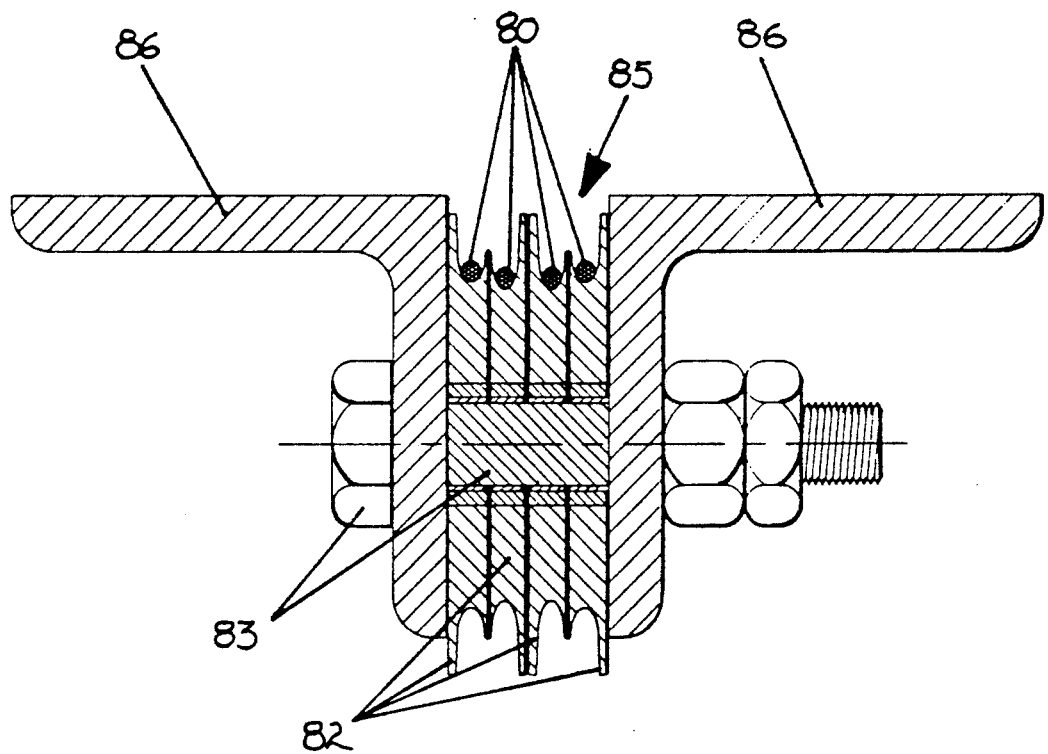
FIG. 22 is a sectional view taken along the line 22—22 of FIG. 7A, showing four cable guide pulleys each of which accommodate cables.

Although in the differential cable drive arrangement illustrated in FIGS. 5 through 7, the differential pulley is shown as the powered or driven member, it will be recognized and understood that any of the various pulleys in the drive train may be powered or driven, since all that is required is to apply a force to the flexible cable. Accordingly, any suitable means for applying a force to the flexible cable 80 will be satisfactory. For example, FIG. 7A is another diagrammatic sectional view illustrating another arrangement of routing and diagrammatic sectional view illustrating another arrangement of routing and connecting the drive cable with the rim and wherein the differential pulley is connected to the rim, the direction turning pulleys 87 and 89 are connected to the rim ground supports, and one of such direction turning pulleys is powered and driven. Included in FIG. 7A is a region of circumference of the track 34 in which the part of the loop of cable going in one direction overlaps the part of the loop going in the other. In this region, four separate pulleys 82 (also see line 22—22 FIG. 7A) are required as illustrated in FIG. 22.

For many applications the arrangement illustrated in FIG. 7A will be the preferred arrangement, since it allows for more than 270 degrees of rotation and also allows the drive motor to be mounted nearer the ground which makes servicing and maintenance more convenient. Also, although the direction turning pulleys 87 and 89 are illustrated as being anchored at spaced-apart points (e.g. at rim ground supports 50), such direction turning pulleys can be anchored at the same location.

In the arrangement illustrated, multiple passes of cable over the same diameter groove are made possible by the idler pulleys 76 and 78 on either side of the differential pulley 68, with loops from the major diameter grooves going around the idler pulley 78 on one side and loops from the minor diameter grooves going around the idler pulley 76 and in the opposite direction. This arrangement minimizes the radial loads on the differential pulley 68. While the use of one or more idler pulleys is convenient and effective, any other suitable means which will maintain the flexible cable in driving engagement with the differential pulley may be employed. In addition to providing a rigid drive for the main support structure 32, the drive cable 80 can be sized to hold the main support structure 32 to the rollers 56 mounted on the rim support piers 50 under any wind conditions. Locating the Right Ascension drive module 60 on one rim support pier 50 outside the rollers 56 as shown in FIGS. 4 and 7, allows the cable, for wind events coming from the same side, to hold the rim 34 of the main support structure 32 to the rollers without interfering with the rollers 56. A pair of side-by-side hold-down pulleys 88 are provided on the rim support pier 50 on the opposite side to provide the same function for winds from that direction. A suitable means 90 for taking out play and pretensioning the loop of cable 80 may be conveniently integrated with the pair of hold-down pulleys 88 by means of a turnbuckle 92, or other tension adjusting means, as illustrated in FIG. 7.

In operation, for each revolution the differential pulley 68 (FIG. 7A) is rotated clockwise, since the length of cable metered off the major diameter 72 is slightly more than that wound on the minor diameter 74, the rim 34 travels counterclockwise one-half the difference between the circumferences of the major and minor diameter sections 72 and 74 of differential pulley 68.

Driving the large diameter rim 34 provides a large mechanical advantage which minimizes the speed reduction and torque rating of the various drive approaches, minimizes the strength required in other components, and allows very precise tracking with minimal lost motion. The use of a motor with a worm gear speed reduction unit prevents motion except when driven by the motor and eliminates the need for a brake or other locking device. The use of cable as the driving means in the foregoing differential drive arrangement allows a very strong inexpensive machine element with outstanding reliability in exposed use outdoors, not only to fix the main support structure so that the system points in the desired direction, but also to anchor it directly to widely spaced foundations.

Referring again to FIG. 4, the system 30 includes a main bicycle wheel-type tension-compression structure 132 which is similar to the main support structure 32 shown in FIG. 2. The main tension-compression support structure 132 includes a rim 34 and a rectangular concentrator frame assembly 136 passing through the plane of the rim 34 and rigidly connected to it. The concentrator frame assembly 136 carries a plurality of dynamic Fresnel transducer elements 46. An axis beam 138 is connected with the frame 136. Since the system 30 is shown as being equatorially oriented, the concentrator frame assembly 136 and the axis beam 138 are disposed parallel with the earth's axis and with the axis beam 138 passing through the center of rim 34. The axis beam 138 thus has an end 140 designated the polar end and an end 142 opposite the polar end 140 designated the equatorial end. A hub 144 is suitably mounted near the polar end 140 of the axis beam 138 and a hub 146 is arranged to be rotatably mounted near the equatorial end 142. Mutual stabilization of the rim and the concentrator frame assembly is provided by a plurality of main tension members 42 which are connected in wheel-spoke arrangement between the rim 34 and the hubs 144 and 146.

It is desirable to make the concentrator frame assembly 136 as light and inexpensive as possible, however, with large lightweight frame structures there is the possibility of undesirable distortion especially at the extremities and corners. To provide additional rigidity, auxiliary tension members 148 may be directly connected between the rim 34 and spaced apart points on the lightweight concentrator frame assembly 136. The use of these lightweight auxiliary tension members 148 makes it possible to prevent distortion which may otherwise be present without adding much additional weight.

The tension members 42 are arranged and constructed so that the forces on the polar half of the concentrator assembly and axis beam are symmetric with forces on the equatorial half. Since the main tension-compression support structure 132 in accordance with this invention is so strong and rigid and provides for distributing the weight of the concentrator frame assembly 136, the transducer elements 46, and other associated components, as well as the wind and other forces through the rim 34 directly to the ground, the concentrator frame assembly 136 can be made much lighter than in known prior art systems such as that of FIG. 1, for example.

Concentrator frame assembly 136 includes a pair of outboard beams 150 and 151 and a pair of end girders 154 and 155. Since structural and design criteria promote simplicity afforded by dividing the concentrator frame 136 into two planes of transducer elements, a central structural beam 156 is connected between the end girders 154 and 155 and divides the concentrator frame into an east bank and a west bank. A central girder 158 is connected with the central structural beam 156 and to the outboard beam 150. A similar central girder 159 is connected with the central structural beam 156 and to the outboard beam 151. The central structural beam 156 and central girders 158 and 159 divide the concentrator frame 136 into east and west polar quadrants and east and west equatorial quadrants.

Central structural beam 156 and central girders 158 and 159, in addition to providing structural rigidity to the concentrator frame assembly 136, also provides for the connection of the concentrator frame assembly 136 securely and rigidly to the rim 34 of the main supporting structure 132. Mounting flanges 160 and 161 are provided on the outboard beams 150 and 151 adjacent the outboard ends of the central girders 158 and 159, respectively. The flanges 160 and 161 mate with and are bolted or otherwise securely fastened to the inside of the rim 34.

Figure 10:
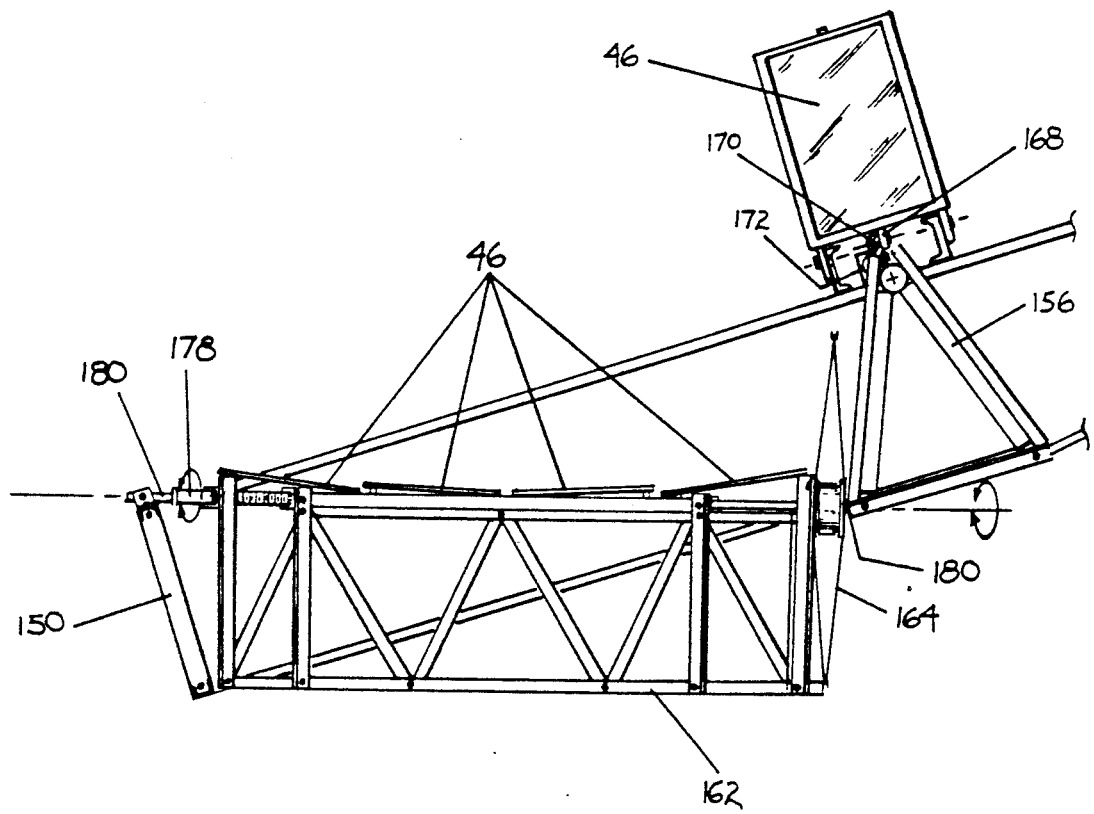
FIG. 10 is a sectional view taken along the line 10—10 of FIG. 4 showing one of the transducer element supporting assemblies and its connection with the concentrator frame.

Transducer elements 46 are carded by transducer element supporting assemblies 162 (FIG. 10 and 13) disposed on both sides of the central structural beam 156. That is, transducer elements 46 and the associated supporting assemblies 162 are disposed in the east bank and in the west bank of the concentrator frame assembly 136. Structural and geometrical requirements of the central structural beam 156, in addition to the presence of a declination drive wheel 164 on the inboard end of each transducer element supporting assembly 162, result in an inactive area down the center. This region can be covered by transducer elements 46 which can be conveniently arranged to be moved to accommodate the +/−11.5 degree declination motion by use of a suitable draglink 168 operating cranks 170 and driven from a suitable linear actuator 172 as shown in FIG. 10.

The transducer element supporting frame assemblies 162 (FIG. 13) are conveniently constructed from a plurality of similar structural side members 174 and 175 connected together at one end and a third member 176 connected with the other ends of members 174 and 175 so as to provide for a triangular shaped transducer element supporting assembly 162. Each of the supporting frame assemblies 162 includes an axially extending bushing 178 connected at each end. The transducer element supporting frame assemblies 162 may be arranged dihedrally within concentrator frame 136 and are mounted for rotational movement therein. As shown, the bushings 178 extending from the outboard ends of each of the reflector element supporting frames 162 disposed on the westt side of the central structural beam 156, are positioned over suitable stub shafts 180 provided near the top of the side beam 150, while the bushings 178 extending from the inboard ends of such supporting frames 162 are positioned over similar stub shafts 180 disposed near the bottom of central beam 156. Similarly, the bushings 178 extending from the outboard ends of each of the transducer element supporting frames 162 disposed on the eastt side of the central structural beam 156 are positioned over suitable stub shafts 180 provided near the top of the other outboard beam 151, while the bushings 178 extending from the inboard ends of such transducer element supporting frames 162 are positioned over stub shafts 180 provided near the bottom of central beam 156. The inboard ends of each of the transducer element supporting frame assemblies 162 form a dihedral angle with the central beam 156. This dihedral arrangement permits the maximum active area of concentrator reflective surface to be utilized. The ideal dihedral angle occurs when the perpendicular bisectors of the axes of opposite supporting frame assemblies 162 intersect at a point at a distance twice the focal length of the reflective surface of the concentrator assembly from the frame. This minimizes both shading and blocking between transducer elements 46 and the clearance required between adjacent supporting frame assemblies 162.

Using supporting frame assemblies 162 allows for selectively moving the transducer elements 46 and also allows gravity and wind forces to be distributed throughout the structure and through the large rim 34 and into the ground supports. In addition, spaces between transducer elements allow wind to pass through the concentrator which reduces wind loads. When not operating, the transducer elements can be turned to minimize exposure to wind and to reduce buildup of condensation and dirt.

Figure 8:
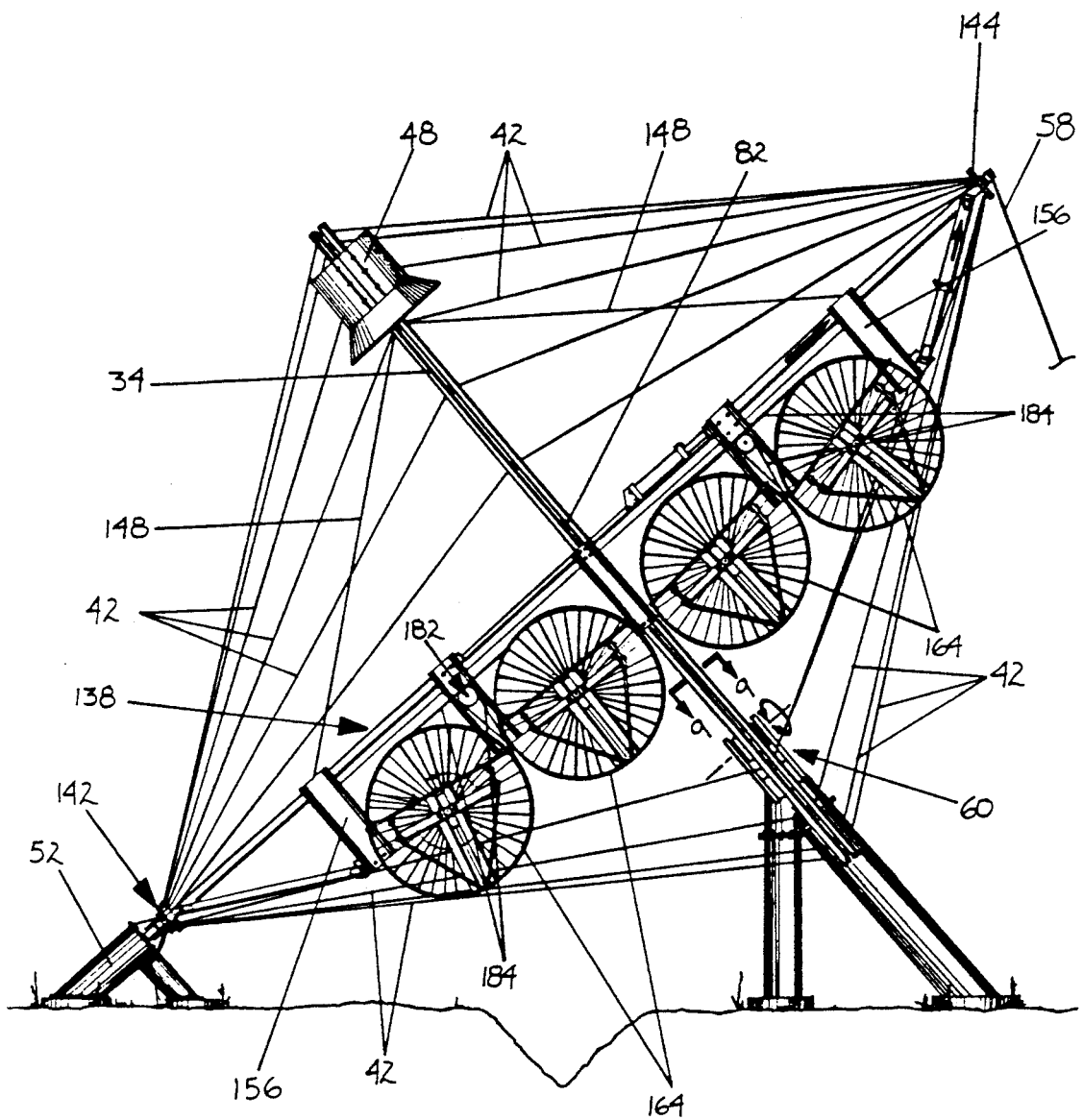
FIG. 8 is a sectional view taken along the line 8—8 of FIG. 4 showing details of the transducer element supporting assemblies and their drive wheels for selectively moving the transducer elements.
Figure 11:
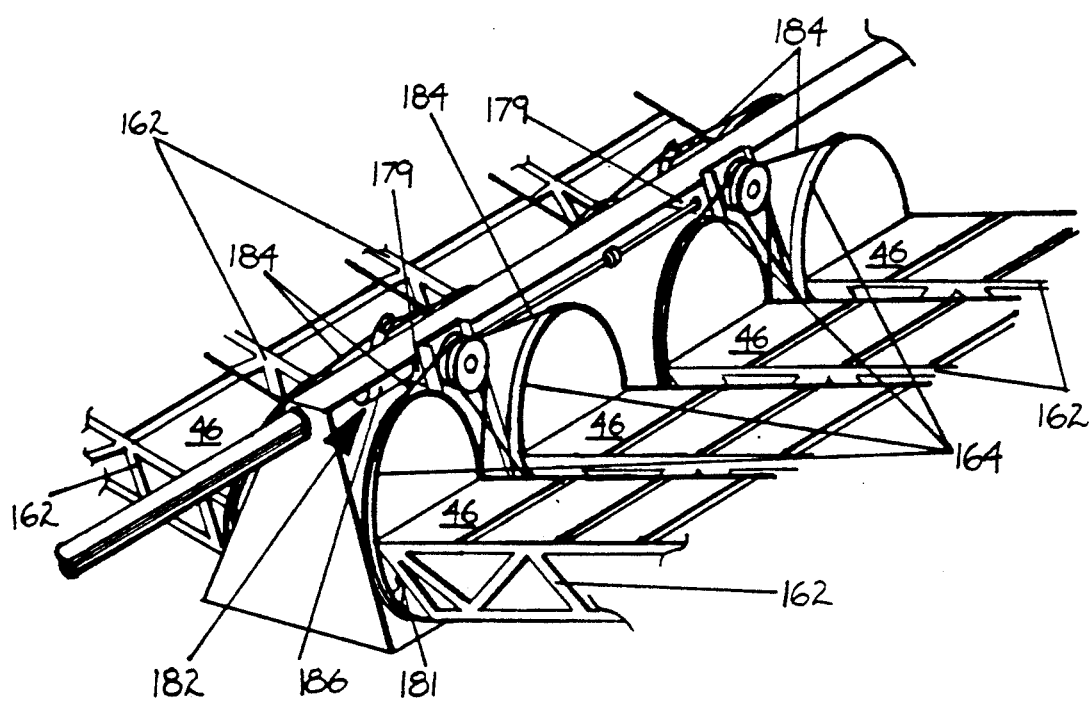
FIG. 11 is a diagrammatic view illustrating a cable arrangement for imparting rotational movement to the transducer element supporting assemblies.

A suitable Declination drive arrangement 182 to effect rotation of the transducer element supporting assemblies 162 to provide for the second motion (declination) to adjust for the seasonal elevation changes in the solar position is shown more clearly in FIGS. 8 and 11. Drive wheel 164 is secured to the inboard ends of each of the transducer element support frame assemblies 162. Drive wheels 164 are connected with a Declination drive means 182 to provide for rotation of the transducer element supporting frame assemblies 162 to provide for the desired selective movement of the reflector elements 46 to adjust for the seasonal variation of the solar position.

Figure 11A:
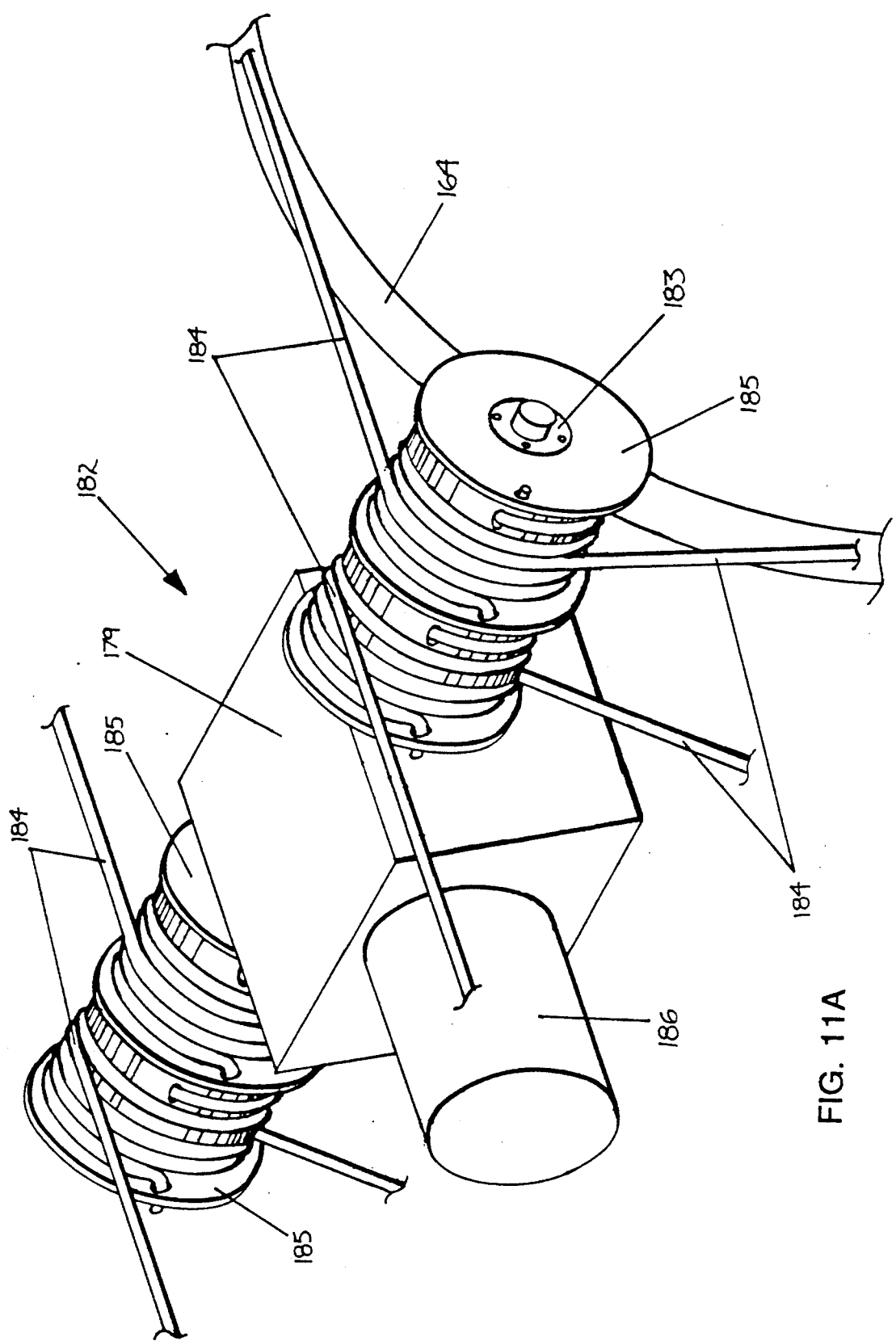
FIG. 11A is a diagrammatic view showing details of the declination drive as also shown in FIG. 11.

FIG. 11 and FIG. 11A show one way of coupling the drive wheels 164 to the Declination drive means 182 to rotate the transducer element supporting assemblies 162. As shown, both ends of a flexible drive cable 184 are fastened to a dedicated differential pulley 185 which includes adjusting and locking means 183. Multiple wraps of the flexible drive cable 184 are disposed around the dedicated differential pulley 185 with a single wrap around and attached to its drive wheel 164 so that as the cable 184 is driven by the gear reduction unit 179 which is powered by the motor 186, the drive wheels 164 are caused to rotate to thereby cause rotation of the associated transducer element supporting assemblies 162.

Figure 12:
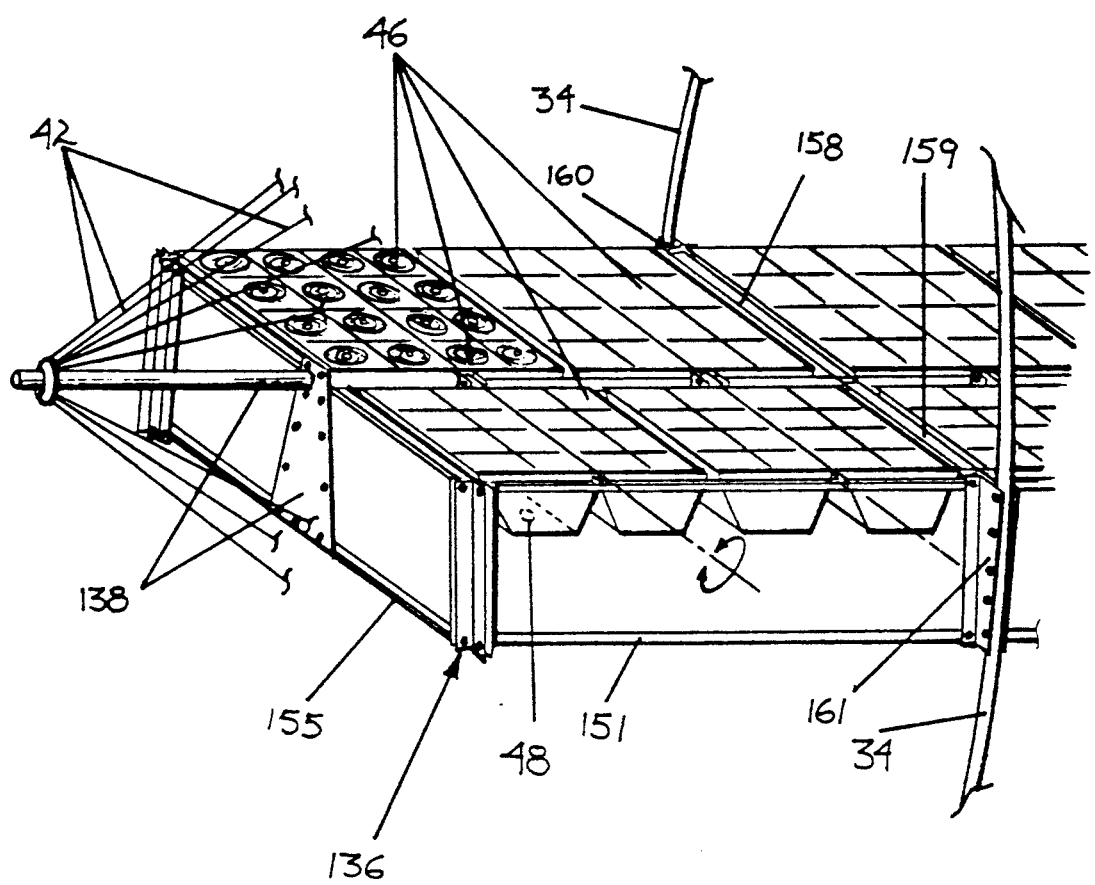
FIG. 12 is a fragmentary perspective view of a concentrator frame assembly wherein the transducer elements are refracting elements.

In FIG. 12 there is illustrated a portion of a concentrator frame assembly wherein the transducer elements 46 are refracting elements. The concentrator frame assembly 136 and its connection to the rim 34 is similar to that shown in detail in FIG. 4. As shown, the receiver 48 is disposed below the refracting transducer elements 46 to receive the solar radiation directed to it from the transducer elements 46.

Similarly, in FIG. 13 the transducer elements 46 are shown as being of the direct energy conversion type, such as suitable photovoltaic cells. For use with conventional photovoltaic concepts, arrays of cells which utilize natural sunlight, or concentrating modules can be employed. It will be understood that when the transducer elements are of the direct energy conversion type they include or constitute their own receiver means for the solar radiation. Accordingly, no separate receiver means is required.

As previously indicated, the plane of the concentrator frame assembly 136 can be either perpendicular to the plane of the curved rim 34 or disposed at some other angle. For example, the concentrator frame and transducer elements carried thereby may be disposed at an angle α in the range of about 40 to 50 degrees with respect to the axis of rotation to permit the "fixed focus" operation of a solar furnace as shown, for example, in FIGS. 14 and 15.

Figure 16:
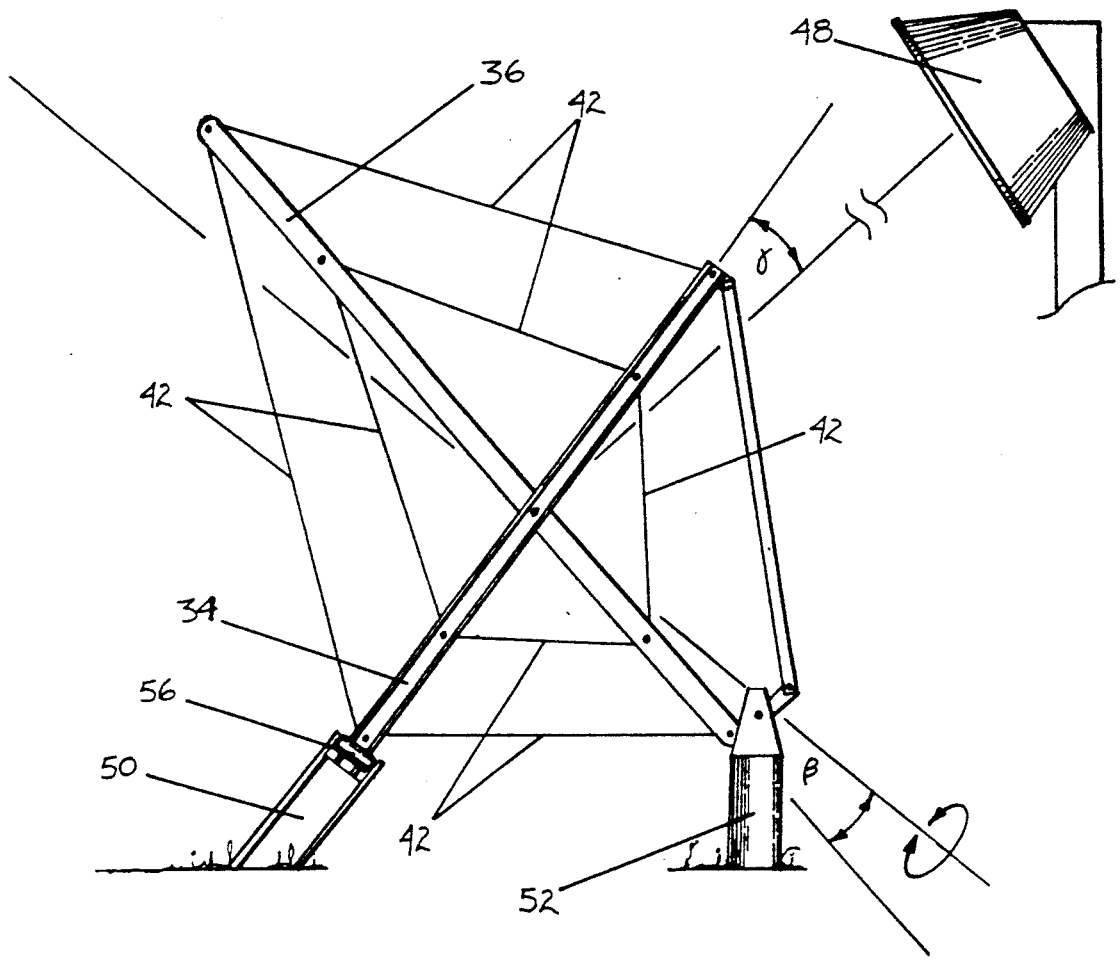
FIG. 16 is a schematic perspective view of a solar radiation collector system in accordance with this invention arranged as a heliostat.

Also, the concentrator frame assembly can be disposed within the main tension-compression supporting structure at an angle with respect to the axis of rotation for operation as a heliostat as shown in FIG. 16. The heliostat form of the device is somewhat different from the other forms in that the concentrator rotates half the angular excursion of the sun in both directions. This is a result of having a single fixed receiver 48 arranged to accept energy form a large array of individual heliostats. Once installed, the relationship between each individual heliostat and the receiver 48 is fixed. The motion of the concentrator normal can be thought of as an average of two vectors, the fixed vector toward the receiver 48, shown by angle γ in FIG. 16, and the vector toward the sun from the heliostat. The latter vector continually moves during the day and also varies with the seasons. The average will move "half" as much as the moving vector. For rotation about the primary axis, this results in a maximum active range of about 120 degrees, dependent on latitude, instead of about 240 degrees for a solar furnace or other two-axis tracking solar collector.

The secondary rotational axis is most effective when the concentrator normal is approximately perpendicular to the primary axis. There is an engineering tradeoff between changing the primary axis and installing the frame at the angle β shown in FIG. 16. For a "north field" geometry, at mid latitudes, with the heliostats in a 45 degree half angle cone (viewed from the receiver), the angle β ranges to around +/−11 degrees.

Figure 17:
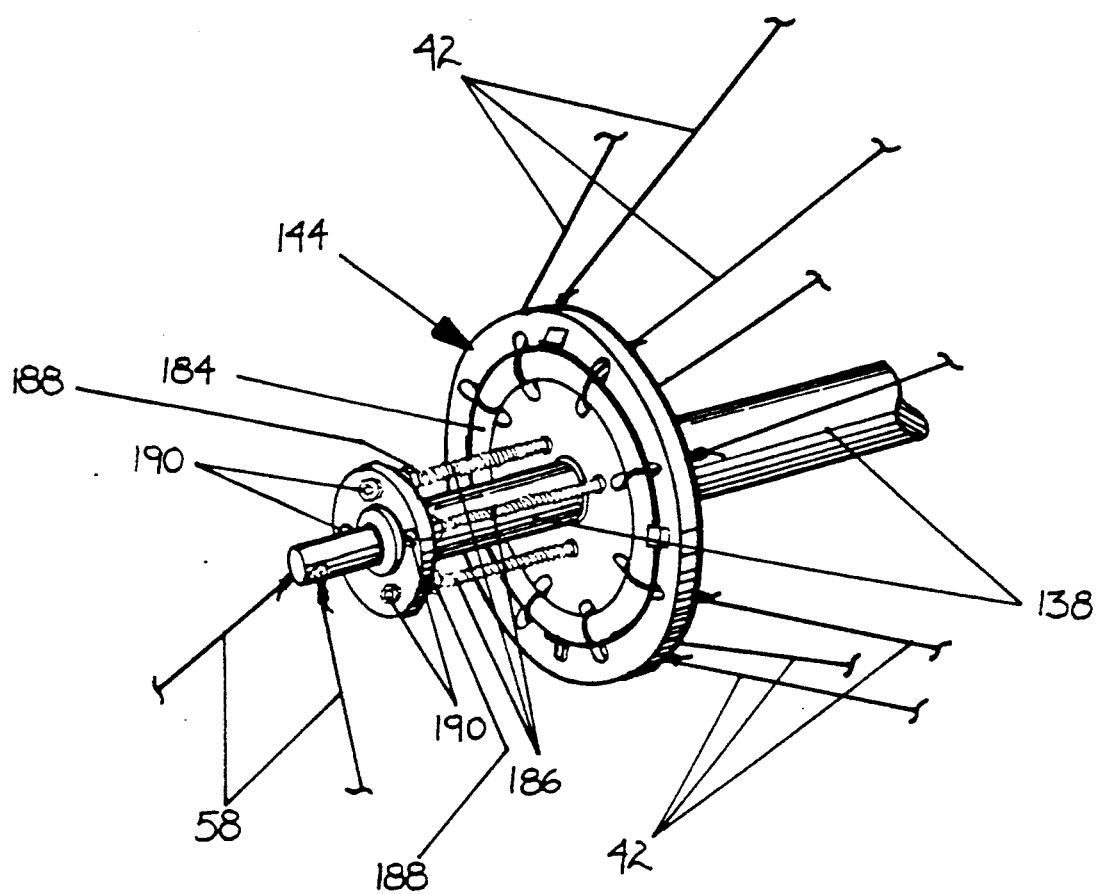
FIG. 17 is an enlarged fragmentary perspective view of the hub mounted near the polar end of the axis beam illustrating one arrangement for adjusting the tension of the tension members.

As shown in FIG. 4 the main tension-compression support structure 132 is also provided with a suitable means for adjusting the tension of the main tension members 42. Adjustment of the main tension members 42 may be provided in any suitable manner such as, for example, by providing for the individual adjustment of each of the tension members by means such as that used to adjust the tension of the spokes of a bicycle wheel, by adjustment of the axial position of the hub 144 at the polar end 140 of the axis beam 138, or in any other suitable manner. As shown in FIG. 17 the hub 144 may be provided with a suitable ring 184 to which all of the individual tension members 42 are suitably connected. Adjustment of the axial position of the hub 144 will thus provide for the desired adjustment of the tension of all of the tension members 42. As shown, this axial adjustment of the hub 144 can be conveniently provided by means of a plurality of threaded rods 186, adjusting nuts 190, and locking nuts 188.

Figure 18:
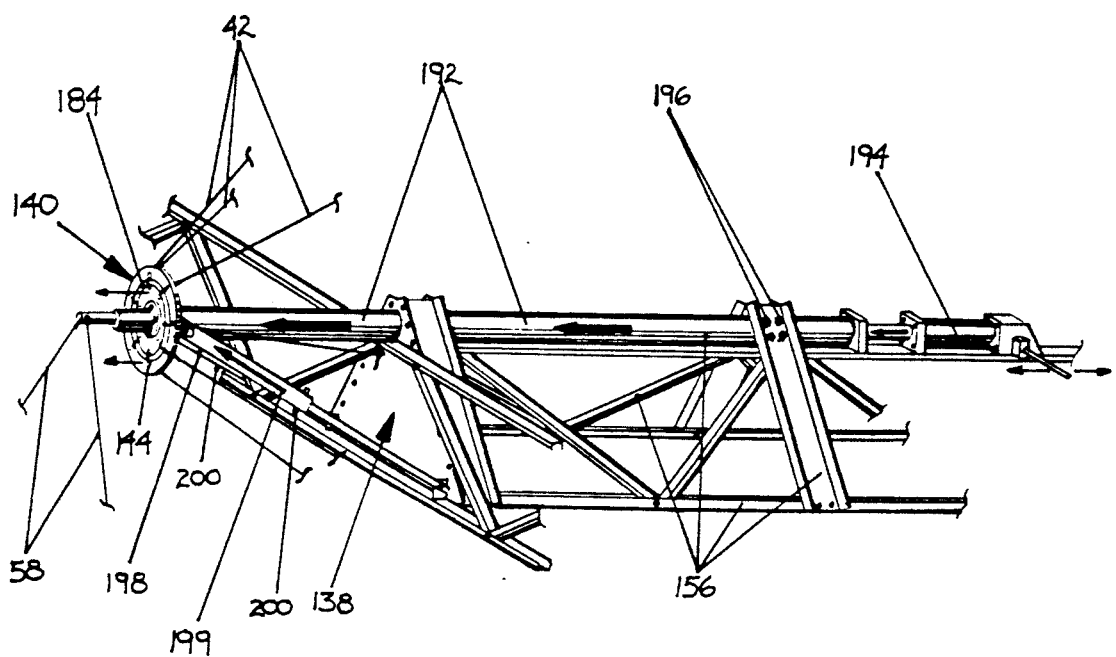
FIG. 18 is a fragmentary perspective view of the polar end of the axis beam and associated structural members illustrating another arrangement for adjusting the tension of the tension members.

Preferably, as shown in FIG. 18 the means for axially moving the hub 144 for adjusting the tension of the main tension members 42 is accomplished by providing a telescoping tubular extension 192 on the polar end 140 of the axis beam 138 and employing a small hydraulic jack 194, or other suitable force producing means, to move the tubular extension 192 axially along the axis beam 138 until the desired tension is achieved in the main tension members 42. When the desired tension has been achieved, the tubular extension 192 is locked in place with a suitable fastening means, such as bolts 196, to permanently hold the tubular extension 192 in the desired position. After the tubular extension 192 is locked in place, the jack 194 may be removed. To allow for the axial movement of tubular extension 192 along the axis beam 138, the bracing strut members 198 and 199 which give support and rigidity to the polar end 140 of the axis beam 138 must also be made to telescope. After the desired tension has been achieved, these bracing strut members 198 and 199 are similarly locked in position by a suitable fastening means, such as bolts 200. The foregoing described arrangement has the added advantage that the tension adjustment can be accomplished in a convenient and simple manner from within the main support structure.

Figure 19:
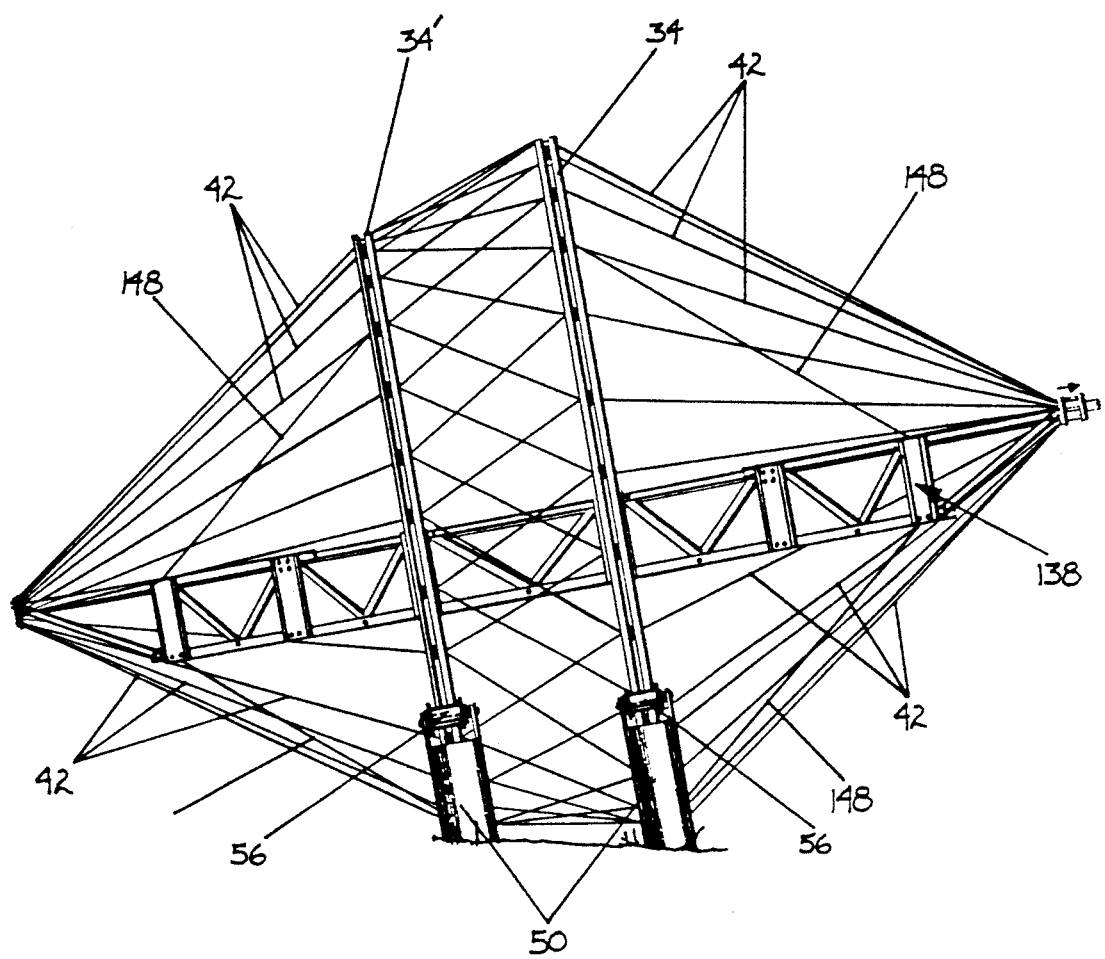
FIG. 19 is a schematic perspective view of a solar radiation collector system in accordance with another embodiment of this invention wherein the main support structure includes two curved rims.

In FIG. 19 there is shown a schematic elevation view of a solar radiation collector system in accordance with another embodiment of this invention which may be useful in the tropics. As shown, the collector system comprises a similar stiff, lightweight, bicycle wheel-type tension-compression main support structure such as that shown in FIGS. 2 and 4, except that the system employs two curved rims 34 and 34' disposed in spaced apart relationship. As shown in FIG. 19, the rim 34' is of a smaller diameter than that of rim 34, however, it should be understood that both of the rims may be of the same diameter which would be appropriate near the equator. The use of two curved rims makes it possible to achieve the desired three dimensional support and stabilization with addition of two additional rim support piers 50 without requiring a tall equatorial pier. That is, when the collector system employs a plurality of curved rims the additional support pier 52 is not required. In all other respects, the collector system illustrated in FIG. 19 may be the same as that shown and described with respect to the embodiments shown in FIGS. 2 or 4.

The primary motion of the desired two axis tracking solar collector system 30 is provided by rotation of the main support structure for the Right Ascension movement (primary horizon to horizon movement). As previously described, to provide for the second axis of motion (declination) to adjust for the seasonal elevation changes in the solar position, the entire concentrator assembly may be pivotally or otherwise movably mounted so as to be capable of being moved within the main support structure, or only the reflective surface of the concentrator assembly may be arranged and constructed so as to be suitably movable with respect to the concentrator frame. Alternatively and preferably, instead of arranging for the moving of the entire concentrator assembly or the moving of the entire reflective surface thereof, the concentrator assembly may be arranged and constructed to provide for the selective movement of the transducer elements 42. Accordingly, rotation of the main support structure provides for the primary or Right Ascension movement of the transducer elements to produce the desired daily horizon to horizon tracking of the solar position. The desired Declination motion to adjust for the seasonal elevation changes in the solar position is provided by suitable movement of the concentrator, or by movement of the reflective surface of the concentrator, or by the selective movement of the transducer elements. Accordingly, the solar collector system 30 in accordance with this invention properly tracks the sun throughout the day and also throughout the year.

When not in operation, the solar collector system is normally parked in the noon position which presents a minimum drag to east and west winds. The transducer elements are stowed in a position turned away from the receiver at an attitude which minimizes north and south wind loads, prevents deposition of frost, dirt, bird droppings, or snow on the reflective surface, and/or protects the mirrors or other transducer elements from damage from hail. At an appropriate time before sunrise, if no stow conditions exist, a suitable controller turns on the Right Ascension drive in an easterly direction so that the collector system is in position when the sun becomes visible at the horizon. If heat is required and no non-operational conditions exist, the flow of a heat transfer fluid is initiated at a flow rate appropriate for the insolation level.

Once flow of the heat transfer fluid is established, the Declination drive means powers the transducer elements from their stow position to the orientation appropriate for the time of year. For an equatorially oriented collector system as described herein, the angles between the face of the transducer assemblies and the planes of the concentrator in the equatorial and polar halves are symmetrical at equinox. At this time the inflection region where the direction the transducer elements are tipped, changes from plus to minus is centered on the perpendicular bisector of the axis beam. At other times of year, this region moves away from this symmetry. In the spring and summer, the transducer assembly with the minimum angle is located in the polar half with the extreme occurring at the summer solstice. In the fall and winter this inflection region moves through the equatorial half.

The Right Ascension drive powers the main tension-compression support structure and the concentrator frame and transducer elements carried thereby, to turn an average of 15 degrees per hour. If the solar radiation collector system is properly aligned on the polar axis, the Declination drive would not be moved much except possibly near equinox where the seasonal progress of the sun is most rapid. The flow rate of the heat transfer fluid may be changed to accommodate insolation changes or process requirements throughout the day. When clouds block the sun for about ten minutes, the mirrors are stowed to avoid being broken by hail and to keep them clean. If the sun reappears, a re-startup sequence is initialized. At the end of the day or if wind above a programmed threshold is detected (which may be different at various orientations with a minimum when facing the horizon), the transducer elements along with the tracking collector structure are stowed.

Other embodiments may be required in order to further minimize costs associated with operating these kinds of devices. Because the scale of these structures can be quite large access for maintenance can become a problem. In smaller devices the tension members limits access by boom truck or manlift. In the larger units, commercially available lifts might not have adequate reach. In any event, working close to fragile mirrors with heavy equipment risks damage. Because these structures are substantial and can easily support personnel, including provisions for access such as ladders, walkways and maintenance platforms may be cost effective.

The overall tension-compression, bicycle wheel type configuration of the main support structure 32 is very stiff, lightweight, stable in all orientations, and allows efficient use of materials since most of the loads are carried by the curved rim 34 in distributed fashion by high performance members under tension. The weight is distributed to the ground through the rim support piers 50 which can be disposed about ninety degrees apart on the rim, and through the hub support pier 52 which supports the end nearest the equator. This provides a stable triform foundation upon which the main support structure and its associated components mounts. Moreover the main support structure can support heavy receivers since the tension members prevent relative motion between the receiver and the frame 36 carrying the transducer elements as the collector system points in various directions. The stability resulting from the shape of the main support structure 32 can be transferred in a balanced way to the frame 36 carrying the transducer elements through the use of a plurality of tension members 42 which reduce the materials required in that structure to maintain its shape and minimize distortion when oriented in various attitudes or buffeted by high winds. The tension and compression built into the structure during construction establishes the natural frequencies of the structural members at a high enough value to prevent wind turbulence from exciting such natural frequencies and destroying the structure.

The foregoing described two-axis tracking, solar collector system 30 combines for the first time an integral, stiff, lightweight, rotatably supported and stabilized, bicycle wheel-type, main tension-compression support structure capable of carrying a large concentrator assembly with means for selectively moving the transducer elements of the concentrator assembly to provide for the second axis of motion. The main tension-compression support structure comprises a curved rim, a structural means carrying solar radiation transducer elements passing through the plane of the rim and rigidly connected to it, and means connected between the rim and the structural means for providing mutual stabilization of the rim and the structural means. The main support structure is supported for rotation with respect to the ground with stabilization in three dimensions. When incorporated with a suitable receiver and drive means, this main tension-compression support structure provides the primary tracking axis. The second axis of motion (declination) to adjust for the seasonal changes in the solar position is preferably provided by the selective movement of the transducer elements 46.

The main tension members 42 (and auxiliary tension members 148 if employed) on the polar half of the solar concentrator assembly are preferably arranged to be balanced by others on the equatorial half. This results in symmetric forces which can be programmed to increase the rigidity of the tracking solar collector system to give it high frequency (>2 cps) response to dynamic loading. Accordingly the bicycle wheel-type tension-compression main support structure described is not only extremely stiff, strong and lightweight, but also minimizes deflections caused by wind and gravity as the main support structure carrying the large concentrator assembly changes orientation throughout the day as it follows the sun. This also allows the sizes of the various structural members to be reduced which minimizes the cost of the structure. In addition, the stiffness of the integrated structure allows the solar collector system to not only operate in high winds but enables it to survive hurricane force gales in the stow position without requiring additional weight or adding special survival mechanisms or procedures.

Further, by appropriate location of the various major components of the solar collector system, the center of gravity is readily placed near the center of the rim 34. That is, the juxtaposition of the concentrator assembly and the receiver 48 at appropriate distances from the axis of rotation of the main support structure 32 results in the centering of the center of gravity at the center of the rim 34. Since the position of the active components of the solar collector system 30 provides the balance, additional weights are not needed to balance the solar concentrator assembly. This results in smaller bearings and minimizes the power needed to drive the system.

Although only certain specific embodiments of the invention have been described in detail herein with reference to the accompanying drawings, it is to be understood that the invention is not limited to those specific embodiments and that various changes and modifications will occur to and be made by those skilled in the art. The appended claims, therefore, are intended to cover all such changes and modifications as fall within the true spirit and scope of the invention.

We claim:

1. A solar radiation collector system, comprising:
   at least one curved rim;
   structural means carrying at least one radiation transducer means connected with said curved rim;
   mutual stabilization means interconnecting said curved rim and said structural means,
   said mutual stabilization means, said curved rim, and said structural means forming an integral, distributed force, tension-compression unit which is stable in all orientations;
   receiver means disposed at a point of focus of said radiation transducer means for receiving solar radiation directed to it by said radiation transducer means;
   ground support means coupled with said tension-compression unit for rotatably supporting said tension-compression unit from the ground, said means including first means having one end rollingly engaging said rim and the opposite end arranged for connection to a first ground support for rotatably supporting said tension-compression unit from said rim to the ground, and second means separate from said first means having one end fixed to said rim and the opposite end extending from said rim and arranged for connection to a second ground support located outside the plane of said rim and including bearing means for rotatably supporting said tension-compression unit from the ground at said second ground support outside the plane of said rim;
   first drive means for imparting rotational movement for said tension-compression unit to effect a desired primary tracking motion to adjust for the apparent motion of the sun; and
   second drive means for moving said radiation transducer means to provide for a second dimension adjustment for the apparent motion of the sun.

2. The solar radiation collector system recited in claim 1 wherein said radiation transducer means includes a plurality of individual radiation transducer elements and said second drive means is arranged and constructed for selectively moving said transducer elements to effect the desired second dimension adjustment for the apparent motion of the sun.

3. The solar radiation collector system recited in claim 1 wherein said receiver means is connected to and movable with said tension-compression unit and disposed at the point of focus of said transducer means.

4. The solar radiation collector system recited in claim 1 wherein said structural means includes a frame carrying a plurality of individual radiation transducer elements, and wherein said mutual stabilization means interconnecting said curved rim and said structural means includes a plurality of tension members connected in distributed manner between said curved rim and said frame and which plurality of tension members together with said curved rim, and said structural means forms said integral, distributed force, tension-compression unit.

5. The solar radiation collector system recited in claim 4 wherein said second drive means is arranged and constructed for selectively moving said transducer elements to effect a desired second dimension adjustment for the apparent motion of the sun.

6. The solar radiation collector system recited in claim 1 wherein said first drive means is a differential drive including an endless loop of a flexible force transmitting element; a pair of direction turning members connected to said support structure; a differential escapement means anchored separate from said support structure and mechanically intermediate said turning pulleys; guide means connected in circumferentially spaced-apart relationship about said support structure for guiding said flexible force transmitting element; said endless loop of flexible force transmitting element arranged to drivingly interconnect said differential escapement means, said guide means, and said direction turning members whereby force applied to said flexible force transmitting element produces a ratioed amount of rotational movement of said main support structure; means for pretensioning said loop of flexible force transmitting element; and motive means for applying force to said flexible force transmitting element.

7. The solar radiation collector system recited in claim 6 wherein said motive means is arranged to drive said differential escapement means.

8. The solar radiation collector system recited in claim 6 wherein said flexible force transmitting element is a flexible cable.

9. The solar radiation collector system recited in claim 1 wherein said first drive means is a differential drive including an endless loop of a flexible force transmitting element; a pair of direction turning members anchored separately from said support structure; a differential escapement means connected with said support structure and mechanically intermediate said direction turning pulleys; guide means connected in circumferentially spaced-apart relationship about said support structure for guiding said flexible force transmitting element; said endless loop of flexible force transmitting element arranged to drivingly interconnect said differential member; said guide means, and said direction turning members whereby force applied to said flexible force transmitting element produces a ratioed amount of rotational movement of said main support structure; means for pretensioning said loop of flexible force transmitting element; and motive means for applying force to said flexible force transmitting element.

10. The solar radiation collector system recited in claim 9 wherein said motive means is arranged to drive at least one of said direction turning pulleys.

11. The solar radiation collector system recited in claim 9 wherein said flexible force transmitting element is a flexible cable.

12. A solar radiation collector system, comprising:
at least one curved rim;
structural means passing through the plane of and connected with said rim, and
mutual stabilization means interconnecting said rim and said structural means, said mutual stabilization means offering negligible interference to the solar radiation and providing mutual stabilization of said rim and said structural means and together with said curved rim and said structural means forming an integral, distributed force, tension-compression unit which is stable in all orientations;
at least one solar radiation transducer means carried by said structural means for providing for a desired utilization of the solar radiation;
receiver means disposed at a point of focus of said solar radiation transducer means for receiving solar radiation directed to it by said solar radiation transducer means;
ground support and stabilization means arranged and constructed for rotatably supporting said integral, distributed force, tension-compression unit from the ground with stabilization in three dimensions and to allow for rotation of said tension-compression unit of at least ninety degrees with respect to the ground,
said ground support and stabilization means including first and second ground support means each having one end rollingly engaging said rim at circumferentially spaced-apart locations on only one side of a diameter of said rim and the opposite ends of said first and second ground support means arranged to be secured to the ground for rotatably supporting said tension-compression unit at said rim to the ground, and a third ground support means, separate from said first and second ground support means, having one end fixed to said rim and the opposite end extending from said rim and arranged for connection to a ground support pier located outside the plane of said rim and including bearing means for rotatably supporting said tension-compression unit from the ground at said ground support pier outside the plane of said rim;
first drive means for imparting rotational movement for said integral tension-compression unit with respect to the ground to effect a desired primary tracking motion to adjust for the apparent motion of the sun; and
second drive means for moving said solar radiation transducer means to provide for a second dimension adjustment for the apparent motion of the sun.

13. The solar radiation collector system recited in claim 12 wherein said structural means includes a frame, and said mutual stabilization means interconnecting said rim and said structural means for providing mutual stabilization of said rim and said structural means and together with said rim and said structural means forms said integral, distributed force, tension-compression unit which is stable in all orientations includes a plurality of main tension members connected in distributed manner between said rim and said frame and forming an open structure and placing the combination of said rim, said structural means, said frame, and said plurality of main tension members in a bicycle-wheel-type tension-compression mode.

14. The solar radiation collector system recited in claim 12 wherein said structural means includes a frame, said solar radiation transducer means carried by said structural means includes a plurality of solar radiation transducer elements carried by said frame, and the combination of said frame and said plurality of solar radiation transducer elements carried by said frame are arranged and constructed to form a solar radiation concentrator assembly having a dynamic Fresnel reflective paraboloidal surface.

15. The solar radiation collector system recited in claim 12 further including an axis beam connected with said structural means and extending through the center of said rim, and wherein said means for providing mutual stabilization of said rim and said structural means includes,
a pair of hubs, one mounted near each end of said axis beam with at least one of said hubs mounted to allow for relative rotation between said hub and said axis beam; and
a plurality of main tension members connected in a distributed manner between said rim and said hubs in a bicycle-wheel-type, rim-spoke tension-compression arrangement.

16. The solar radiation collector system recited in claim 12 wherein said radiation transducer means includes at least one reflector element arranged to direct solar radiation to said receiver means.

17. The solar radiation collector system recited in claim 12 wherein said first drive means is a differential drive including an endless loop of a flexible force transmitting element; a pair of direction turning pulleys disposed in spaced-apart relationship; a differential escapement means connected intermediate said turning pulleys, said differential escapement means including a differential member having adjacent regions of different diameter; one of (a) said direction turning pulleys and (b) said differential escapement means being arranged and constructed to be a fixed member and the other to be the movable member; guide means connected with said support structure and in driving engagement with said flexible force transmitting element for guiding said flexible force transmitting element, said endless loop of flexible force transmitting element arranged to drivingly interconnect said differential member, said guide means, and said direction turning pulleys whereby force applied to said flexible force transmitting element produces a ratioed amount of rotational movement of said main support structure; and motive means for applying force to said flexible force transmitting element.

18. The solar radiation collector system recited in claim 17 wherein said first and second direction turning pulleys are arranged to be the fixed member and are anchored separate from said support structure and said differential escapement means is arranged to be the movable member and is connected with said support structure, and wherein said motive means is arranged to drive at least one of said direction turning pulleys.

19. The solar radiation collector system recited in claim 17 wherein said differential escapement means is arranged to be the fixed member and is anchored separate from said support structure and said first and second direction turning pulleys are arranged to be the movable member and are connected with said support structure, and wherein said motive means is arranged to drive the differential member of said differential escapement means.

20. The solar radiation collector system recited in claim 12 wherein said radiation transducer means includes at least one direct energy conversion device which also constitutes said receiver means.

21. The solar radiation collector system recited in claim 12 wherein said third ground support means extends from said rim parallel with the axis of rotation of said rim toward said ground support pier, and includes a hub connected with said opposite end of said third ground support means, and bearing means coupled with said hub for rotatably connecting said hub with said ground support pier.

22. The solar radiation collector system recited in claim 15 including a plurality of tension members each connected at one end to circumferentially spaced-apart points about said rim and having the other ends connected with said hub.

23. The solar radiation collector system recited in claim 6 wherein said radiation transducer means includes at least one refracting element arranged to direct solar radiation to said receiver means.

24. A solar radiation collector system, comprising:
a main integral, distributed force, tension-compression support structure including:
at least one curved rim;
a frame connected with said rim and extending through the plane of said rim parallel with the axis of rotation of said rim and having an extending end disposed at a location outside the plane of said rim;
a hub rotatably near said extending end of said frame; and
a plurality of main tension members connected in distributed bicycle wheel-type arrangement between said rim and said hub for forming together with said curved rim, said hub, and said frame an open, integral, distributed force, tension compression support structure and providing mutual stabilization of said rim and said frame in all orientations;
a plurality of solar radiation transducer elements carried by said frame and arranged and constructed to form a dynamic Fresnel paraboloidal surface;
a receiver means disposed at a point of focus of said paraboloidal surface for receiving the solar radiation directed to it from said paraboloidal surface;
ground support and stabilization means for rotatably supporting said main integral, distributed force, tension-compression support structure from the ground for rotation of said main support structure of at least ninety degrees with respect to the ground and with stabilization in three dimensions, said ground support and stabilization means including
first ground support means having an end extending from the ground and arranged and constructed for rollingly engaging said rim for rotatably supporting said support structure from said rim to the ground through said first ground support means and second ground support means, separate from said first ground support means and including a ground support pier disposed outside the plane of said rim and having an end extending from the ground and arranged and constructed to be rotatably connected with said hub for rotatably supporting said support structure from the ground at said ground support pier outside the plane of said rim;
first drive means drivingly engaging said rim for imparting rotational movement for said main integral, distributed force, tension-compression support structure to effect a desired primary tracking motion to adjust for the apparent motion of the sun; and
second drive means for selectively moving said solar radiation transducer elements with respect to said frame to provide for a second dimension adjustment for the apparent motion of the sun.

25. The solar radiation collector system recited in claim 24 wherein said hub rotatably mounted near the extending end of said frame is also pivotally connected with said ground support pier.

26. The solar radiation collector system recited in claim 24 wherein said frame is disposed parallel to the earth's axis thereby having a polar end and an equatorial end and wherein said equatorial end of said frame extends outside the plane of said rim and is connected with said ground support pier.

27. The solar radiation collector system recited in claim 24 further including means for adjusting the tension of said plurality of said main tension members.

28. The solar radiation collector system recited in claim 27 wherein said frame is disposed parallel to the earth's axis thereby having polar and equatorial ends, hubs are rotatably mounted near said polar and equatorial ends of said frame, and said means for adjusting the tension of said main tension members includes means for changing the axial position of the hub disposed near the polar end of said frame.

29. The solar radiation collector system recited in claim 24 including a beam disposed parallel with the axis of rotation of said rim and passing through the plane of said rim and rigidly connected with the frame of said main tension-compression support structure.

30. The solar radiation collector system recited in claim 24 wherein said transducer elements are reflector elements arranged and constructed to form a dynamic Fresnel paraboloidal reflecting surface and said receiver means is rigidly connected with said rim at the point of focus of said reflecting surface.

31. The solar radiation collector system recited in claim 24 wherein said transducer elements are reflector elements arranged and constructed to form a dynamic Fresnel paraboloidal reflecting surface and said receiver means is fixed at the point of focus of said reflecting surface and at a location remote from and independent of said main support structure.

* * * * *